United States Patent
Tan et al.

(10) Patent No.: US 10,912,064 B2
(45) Date of Patent: *Feb. 2, 2021

(54) METHOD FOR MANAGING FORWARDING PLANE TUNNEL RESOURCE UNDER CONTROL AND FORWARDING DECOUPLED ARCHITECTURE

(71) Applicant: HUAWEI TECHNOLOGIES CO., LTD., Guangdong (CN)

(72) Inventors: Shiyong Tan, Beijing (CN); Hui Ni, Beijing (CN); Hui Cai, Shenzhen (CN); Weihua Hu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,074

(22) Filed: Apr. 10, 2018

(65) Prior Publication Data

US 2018/0234961 A1 Aug. 16, 2018

Related U.S. Application Data

(63) Continuation of application No. 14/586,046, filed on Dec. 30, 2014, now Pat. No. 9,974,055, which is a
(Continued)

(51) Int. Cl.
*H04W 72/04* (2009.01)
*H04W 76/12* (2018.01)
*H04W 24/04* (2009.01)

(52) U.S. Cl.
CPC ........ *H04W 72/0406* (2013.01); *H04W 24/04* (2013.01); *H04W 76/12* (2018.02)

(58) Field of Classification Search
CPC .. H04W 24/04; H04W 76/12; H04W 72/0406
See application file for complete search history.

(56) References Cited

U.S. PATENT DOCUMENTS

2008/0259873 A1* 10/2008 Ahmavaara ....... H04W 36/0033
370/331
2010/0067462 A1* 3/2010 Beser ...................... H04L 45/00
370/329
(Continued)

FOREIGN PATENT DOCUMENTS

| CN | 101286941 A | 10/2008 |
|----|-------------|---------|
| CN | 102047721 A | 5/2011  |

OTHER PUBLICATIONS

"3rd Generation Partnership Project; Technical Specification Group Core Network and Terminals; 3GPP Evolved Jacket System (EPS); Evolved General Packet Radio Service (GPRS) Tunnelling Protocol for Control Plane (GTPv2-C; Stage 3 (Release 8),"Global System for Mobile Communications, 3GPP TS 29.274, V8.10.0, Jun. 2011, 148 pages.

(Continued)

*Primary Examiner* — Yemane Mesfin
*Assistant Examiner* — Henry Baron
(74) *Attorney, Agent, or Firm* — Womble Bond Dickinson (US) LLP

(57) ABSTRACT

An embodiment of the present disclosure discloses a method and device for managing a forwarding plane tunnel resource. The method includes sending a forwarding plane tunnel resource request message to a forwarding plane device, for enabling the forwarding plane device to allocate a forwarding plane tunnel resource based on the forwarding plane tunnel resource request message; acquiring the allocated forwarding plane tunnel resource from the forwarding plane device; and sending the acquired forwarding plane tunnel resource to a target network element, to establish a packet data network connection with the target network element. By adopting the present disclosure, the load balancing of the forwarding plane device is achieved, the signaling interac-
(Continued)

tion between the control plane device and the forwarding plane device is reduced.

17 Claims, 13 Drawing Sheets

Related U.S. Application Data continuation of application No. PCT/CN2012/077995, filed on Jun. 30, 2012.

(56) References Cited

U.S. PATENT DOCUMENTS

2011/0075549 A1 3/2011 Lu et al.
2014/0241247 A1* 8/2014 Kempf ............... H04L 12/4633
370/328

OTHER PUBLICATIONS

"3rd Generation Partnership Project; Technical Specification Group Core Network and Terminals; 3GPP Evolved Jacket System (EPS); Evolved General Packet Radio Service (GPRS) Tunnelling Protocol for Control Plane (GTPv2-C; Stage 3 (Release 11),"Global System for Mobile Communications, 3GPP TS 29.274, V11.3.0, Jun. 2012, 219 pages.

"Universal Mobile Telecommunications System (UMTS); LTE; General Packet Radio System (GPRS) Tunnelling Protocol User Plane (GTPv1-U) (3GPP TS 29.281, V10.3.0 Release 10)," ETSI TS 129 281, V10.3.0, Oct. 2011, 27 pages.

"3rd Generation Partnership Project; Technical Specification Group Core Network and Terminals; General Packet Radio System (GPRS) Tunnelling Protocol User Plane (GTPv1-U) (Release 12)," Global System for Mobile Communications, 3GPP TS 29.281, V12.1.0, Dec. 2014, 27 pages.

"3rd Generation Partnership Project; Technical Specification Group Services and System Aspects; General Packet Radio Service (GPRS); Service Description; Stage 2 (Release 11)," Global System for Mobile Communications, 3GPP TS 23.060, V11.2.0, Jun. 2012, 335 pages.

"3rd Generation Partnership Project; Technical Specification Group Core Network and Terminals; General Packet Radio Service (GPRS); GPRS Tunnelling Protocol (GTP) across the Gn and Gp Interface (Release 11)," Global System for Mobile Communications, 3GPP TS29.060, V11.3.0, Jun. 2012, 174 pages.

\* cited by examiner

METHOD FOR MANAGING FORWARDING PLANE TUNNEL RESOURCE UNDER CONTROL AND FORWARDING DECOUPLED ARCHITECTURE

CROSS-REFERENCE TO RELATED APPLICATIONS

This application is a continuation of U.S. patent application Ser. No. 14/586,046, filed on Dec. 30, 2014, which is a continuation of International Application No. PCT/CN2012/077995, filed on Jun. 30, 2012. The disclosures of the aforementioned applications are hereby incorporated by reference in their entireties.

TECHNICAL FIELD

The present disclosure relates to the field of communications, and particularly, to a method for managing a forwarding plane tunnel resource under a control and forwarding decoupled architecture.

BACKGROUND

In a 2G/3G mobile packet network architecture under a traditional 3rd generation partnership project (3GPP) specification, network elements such as a serving GPRS support node (SGSN) and a gateway GPRS support node (GGSN) and the like are both responsible for processing various signaling and responsible for forwarding data. But in general, a universal computing platform is more suitable for processing control plane signaling, such as a mobility management, a session management and the like, and a dedicated hardware platform is very strong in processing a performance of user plane data forwarding, but the signaling processing performance is relatively weak. Therefore, in order to improve the user data forwarding throughput to the maximum, a gateway such as a GGSN or the like generally adopts a dedicated hardware platform. The SGSN is focused on processing control plane signaling and generally adopts the universal computing platform, which has a strong ability to process signaling and has a weak ability to forward data. Once user data traffic increases quickly, a capacity of the SGSN needs to be continually expanded or the number of the SGSNs needs to be greatly increased, thus the cost is very high.

To solve the above-mentioned technical problem, a decoupling of control and forwarding is proposed in the development process of a 3GPP mobile broadband network architecture. After being decoupled, a control plane and a forwarding plane may be upgraded and expanded independently, the control plane may be deployed and maintained centrally, and the forwarding plane may be distributed and deployed to optimize route. In R8 stage of a 3GPP standard version, a brand new system architecture evolution (SAE) network is developed, and the system architecture thereof is as shown in FIG. 1, wherein an evolved universal terrestrial radio access network (E-UTRAN) achieves all functions related to radio access of the evolution network, a mobility management entity (MME) is responsible for the mobility management of the control plane, including user context and mobile state management. A serving gateway S-GW is a user plane anchor point between 3GPP access networks and terminates an E-TURAN interface. A packet data network gateway (P-GW) is a user plane anchor point between a 3GPP access network and a non-3GPP access network and is an interface of an external PDN packet data network. A home subscriber server (HSS) stores user subscription information. The MME, the S-GW, the P-GW and the home subscriber server (HSS) constitute a core network, which is referred to as an evolved packet core (EPC). In the SAE architecture, the MME only needs to process the control plane signaling, the S-GW and the P-GW are mainly responsible for forwarding user plane data. The S-GW and the P-GW may be combined into a network element, which is generally referred to as a gateway.

With the development of a mobile internet service, an enrichment of an enterprise network service and an integration of a mobile access network with a variety of systems, a gateway device needs to gradually develop towards more sophisticated service control and charging on the basis of the completion of a basic data forwarding function, in order to support the implementation and control of more abundant services of an operator. But in the SAE architecture, the gateway still needs to keep a large number of external signaling interfaces. The large number of external signaling interfaces of the gateway will bring a large amount of interface signaling, and the signaling processing performance of a gateway using the dedicated hardware platform is not strong, which is liable to become a bottleneck. In order to process a large amount of interface signaling, the gateway is bound to increase a large amount of hardware on the basis of the dedicated hardware platform, such as a computing processor chip or the like, such that the hardware platform of the gateway device is very complicated and too high in cost, which is not conducive to the promotion and deployment of a mobile packet data network.

To solve the processing bottleneck problem of the gateway signaling processing, in the prior art, it is proposed that an interface signaling processing function and a user plane data forwarding function of the gateway are separated. The interface signaling processing function is deployed on a universal computing platform to become a control plane device, and the user plane data forwarding function is deployed on a dedicated hardware platform to become a forwarding plane device. The control plane device processes an external signaling interaction, including general packet radio service tunnelling protocol-control (GTP-C) signaling with the MME and signaling with other network elements, such as signaling with an AAA (Authentication, Authorization, Accounting) server, policy and charging control (PCC) signaling with a policy and charging rules function (PCRF), etc. After finishing a signaling consultation, the control plane device forwards information (referred to as forwarding context) needed by the forwarding plane device for forwarding a data message to the forwarding plane device, and the forwarding plane device forwards a user data message based on context information indicated by the control plane device.

Taking a general packet radio service tunnelling protocol (GTP) bearer establishment in the case of 3GPP access under the SAE architecture as an example, since the principle that the signaling is processed by the control plane device is abided, the technical problem of the abovementioned control and forwarding decoupled solution of the existing gateway lie in that all GTP-C signaling for establishing a forwarding plane GTP bearer is processed by the control plane device, and a forwarding plane internet protocol (IP), a GTP tunnel end identifier (TEID) and a circuit switched identifier (CSID) are all allocated by the control plane, this will bring the following defects.

1) The control plane device has no idea about a load sharing relationship of internal processing units of the forwarding plane device or a mapping relationship of the forwarding plane IP and TEID and GTP protocol processing units in the forwarding plane device, so direct allocation of the control plane device will lead to a load imbalance of each GTP protocol processing unit of the forwarding plane device.

2) The control plane device allocates the forwarding plane IP and the TEID. When one forwarding plane device is controlled by multiple control plane devices, it may need to avoid a conflict between the multiple control plane devices, so that the implementation is complicated.

3) The forwarding plane device is a large-capacity device and still has a local failure condition, in the prior art, in a case that a local failure occurs in the forwarding plane device, the control plane device may be only notified by a large amount of signaling to delete GTP bearers influenced by the failure, and the control plane device notifies other network elements of deleting these GTP bearers through signaling one by one, thus generating a large amount of control signaling.

SUMMARY

The technical problem to be solved in one embodiment of the present disclosure is to provide a method for managing forwarding plane tunnel resources under a control and forwarding decoupled architecture, such that a forwarding plane device may achieve load balancing, and meanwhile in the case of a local failure of the device, may notify a control plane device and other peripheral network elements to delete related packet data network connections through a small amount of signaling.

On one hand, an embodiment of the present disclosure provide a method for managing a forwarding plane tunnel resource under a control and forwarding decoupled architecture, including:

sending a forwarding plane tunnel resource request message to a forwarding plane device, for enabling the forwarding plane device to allocate a forwarding plane tunnel resource based on the forwarding plane tunnel resource request message;

acquiring the allocated forwarding plane tunnel resource from the forwarding plane device; and sending the acquired forwarding plane tunnel resource to a target network element, to establish a packet data network connection with the target network element.

On one hand, an embodiment of the present invention further provide a method for managing a forwarding plane tunnel resource under a control and forwarding decoupled architecture, including:

acquiring a forwarding plane tunnel resource request message sent by a control plane device;

allocating a forwarding plane tunnel resource based on the forwarding plane tunnel resource request message;

sending the allocated forwarding plane tunnel resource to the control plane device, for enabling the control plane device to send the forwarding plane tunnel resource to a target network element to establish a packet data network connection with the target network element.

On one hand, an embodiment of the present disclosure further provide a control plane device for managing forwarding plane tunnel resources, including:

a tunnel resource requesting module, configured to send a forwarding plane tunnel resource request message to a forwarding plane device, for enabling the forwarding plane device to allocate a forwarding plane tunnel resource based on the forwarding plane tunnel resource request message;

a tunnel resource acquiring module, configured to acquire the allocated forwarding plane tunnel resource from the forwarding plane device; and a packet radio service tunnel establishing module, configured to send the acquired forwarding plane tunnel resource to a target network element, to establish a packet data network connection with the target network element.

On one hand, an embodiment of the present disclosure further provide a forwarding plane device for managing forwarding plane tunnel resources, including:

a tunnel request acquiring module, configured to acquire a forwarding plane tunnel resource request message sent by a control plane device;

a tunnel resource allocating module, configured to allocate a forwarding plane tunnel resource based on the forwarding plane tunnel resource request message; and a tunnel resource sending module, configured to send the allocated forwarding plane tunnel resource to the control plane device, for enabling the control plane device to send the forwarding plane tunnel resource to a target network element to establish a packet data network connection with the target network element.

On one hand, an embodiment of the present disclosure further provide a method for managing a forwarding plane tunnel resource under a control and forwarding decoupled architecture, including:

acquiring a set of forwarding plane tunnel resources of a forwarding plane device;

allocating a forwarding plane tunnel resource based on the acquired set of forwarding plane tunnel resources; and sending the allocated forwarding plane tunnel resource to a target network element, to establish a packet data network connection with the target network element.

On one hand, an embodiment of the present disclosure further provide a control plane device for managing a forwarding plane tunnel resource, including:

a forwarding plane information acquiring module, configured to acquire a set of forwarding plane tunnel resources of a forwarding plane device;

a tunnel resource allocating module, configured to allocate a forwarding plane tunnel resource based on the acquired set of forwarding plane tunnel resources; and a packet radio service tunnel establishing module, configured to send the allocated forwarding plane tunnel resource to a target network element, to establish a packet data network connection with the target network element.

On one hand, an embodiment of the present disclosure further provide a method for managing a forwarding plane tunnel resource under a control and forwarding decoupled architecture, including:

sending a set of forwarding plane tunnel resources of its own device to a control plane device, for enabling the control plane device to allocate a forwarding plane tunnel resource based on the set of forwarding plane tunnel resources and send the allocated forwarding plane tunnel resource to a target network element to establish a packet data network connection with the target network element.

On one hand, an embodiment of the present disclosure further provide a forwarding plane device for managing forwarding plane tunnel resources, including:

a forwarding plane information sending module, configured to send a set of forwarding plane tunnel resources of an own device to a control plane device, for enabling the control plane device to allocate a forwarding plane tunnel resource based on the set of forwarding plane tunnel resources and send the allocated forwarding plane tunnel resource to a target network element to establish a packet data network connection with the target network element.

On one hand, an embodiment of the present disclosure further provide a communication device under a control and forwarding decoupled architecture, including the control plane device and the forwarding plane device mentioned above.

On one hand, an embodiment of the present disclosure further provide a communication device under a control and forwarding decoupled architecture, including the control plane device and the forwarding plane device mentioned above.

The implementation of the embodiments of the present disclosure has the following the beneficial effects: by means of reasonable allocation of the forwarding plane tunnel resources, the load balancing of the forwarding plane device is achieved, the signaling interaction between the control plane device and the forwarding plane device is reduced as much as possible, and meanwhile, by maintaining the circuit switched identifiers of respective devices, efficient failure processing may be achieved in the case of a device failure.

BRIEF DESCRIPTION OF DRAWINGS

To illustrate technical solutions in the embodiments of the present disclosure or in the prior art more clearly, a brief introduction on the accompanying drawings which are needed in the description of the embodiments or the prior art is given below. Apparently, the accompanying drawings in the description below are merely some of the embodiments of the present disclosure, based on which other drawings may be obtained by those of ordinary skill in the art without any creative effort.

DETAILED DESCRIPTION OF EMBODIMENTS

A clear description of technical solutions in the embodiments of the present disclosure will be given below, in combination with the accompanying drawings in the embodiments of the present disclosure. Apparently, the embodiments described below are merely a part, but not all, of the embodiments of the present disclosure. All of other embodiments, obtained by those of ordinary skill in the art based on the embodiments of the present disclosure without any creative effort, fall into the protection scope of the present disclosure.

Figure 1:
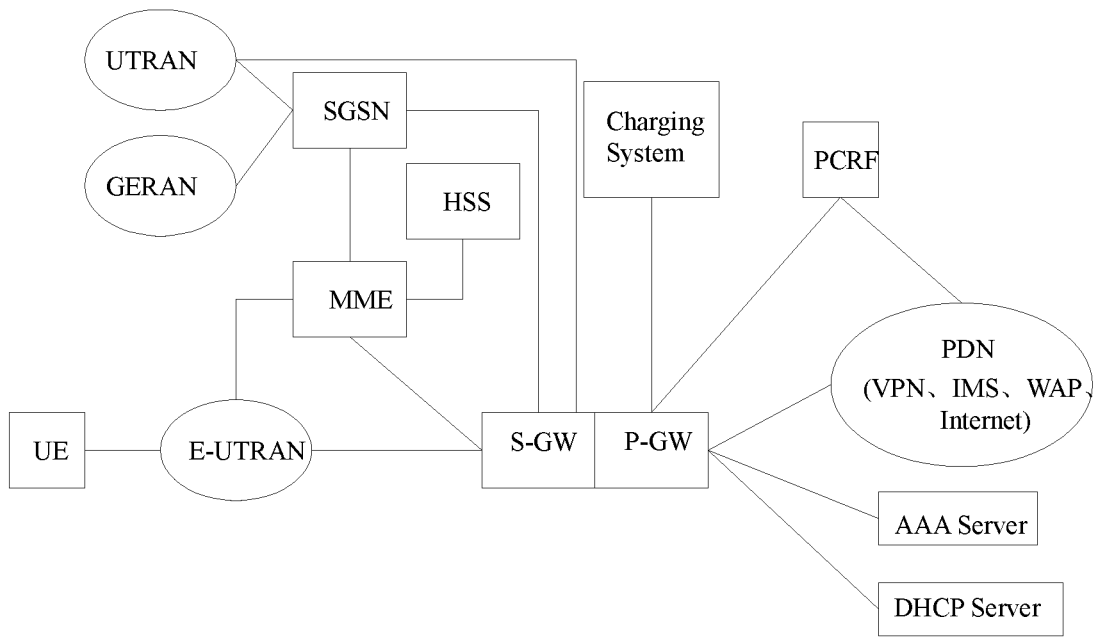
FIG. 1 is a schematic diagram of an SAE network architecture in prior art.
Figure 2:
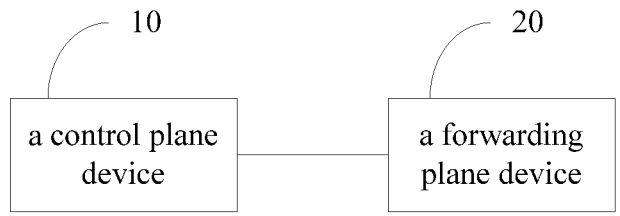
FIG. 2 is a schematic diagram of a structure of a communication device under a control and forwarding decoupled architecture in the present disclosure.

FIG. 2 is a schematic diagram of a structure of a communication device under a control and forwarding decoupled architecture in the present disclosure. The communication device under the control and forwarding decoupled architecture in the present disclosure may be implemented in a radio network controller (RNC), an SGSN and a GGSN in a GPRS network, or an evolved node B (eNodeB), an S-GW, a P-GW and an integrated device of the S-GW and the P-GW in an evolved packet system (EPS) network, or any control and forwarding decoupled GTP, proxy mobile IPv6 (PMIP, including a local mobility anchor LMA, Local Mobility Anchor and a mobile access gateway MAG, Mobile Access Gateway) protocol processing entirety. As shown in the figure, the communication device under the control and forwarding decoupled architecture in the present disclosure at least includes a control plane device 10 and a forwarding plane device 20, wherein in the first and second embodiments of the present disclosure, the control plane device 10 is configured to send a forwarding plane tunnel resource request message to a forwarding plane device, for enabling the forwarding plane device to allocate a forwarding plane tunnel resource based on the forwarding plane tunnel resource request message, acquire the allocated forwarding plane tunnel resource from the forwarding plane device, and send the acquired forwarding plane tunnel resource to a target network element to establish a packet data network connection with the target network element.

The forwarding plane device 20 is configured to acquire the forwarding plane tunnel resource request message sent by the control plane device, allocate the forwarding plane tunnel resource based on the forwarding plane tunnel resource request message, and send the allocated forwarding plane tunnel resource to the control plane device.

In the third embodiment of the present disclosure, the control plane device 10 is configured to acquire a set of forwarding plane tunnel resources of the forwarding plane device, allocate a forwarding plane tunnel resource based on the acquired set of forwarding plane tunnel resources, and send the allocated forwarding plane tunnel resource to the target network element to establish the packet data network connection with the target network element.

The forwarding plane device 20 is configured to send a set of forwarding plane tunnel resources of its own device to the control plane device.

Two embodiments in the present disclosure are illustrated below in detailed.

Figure 3:
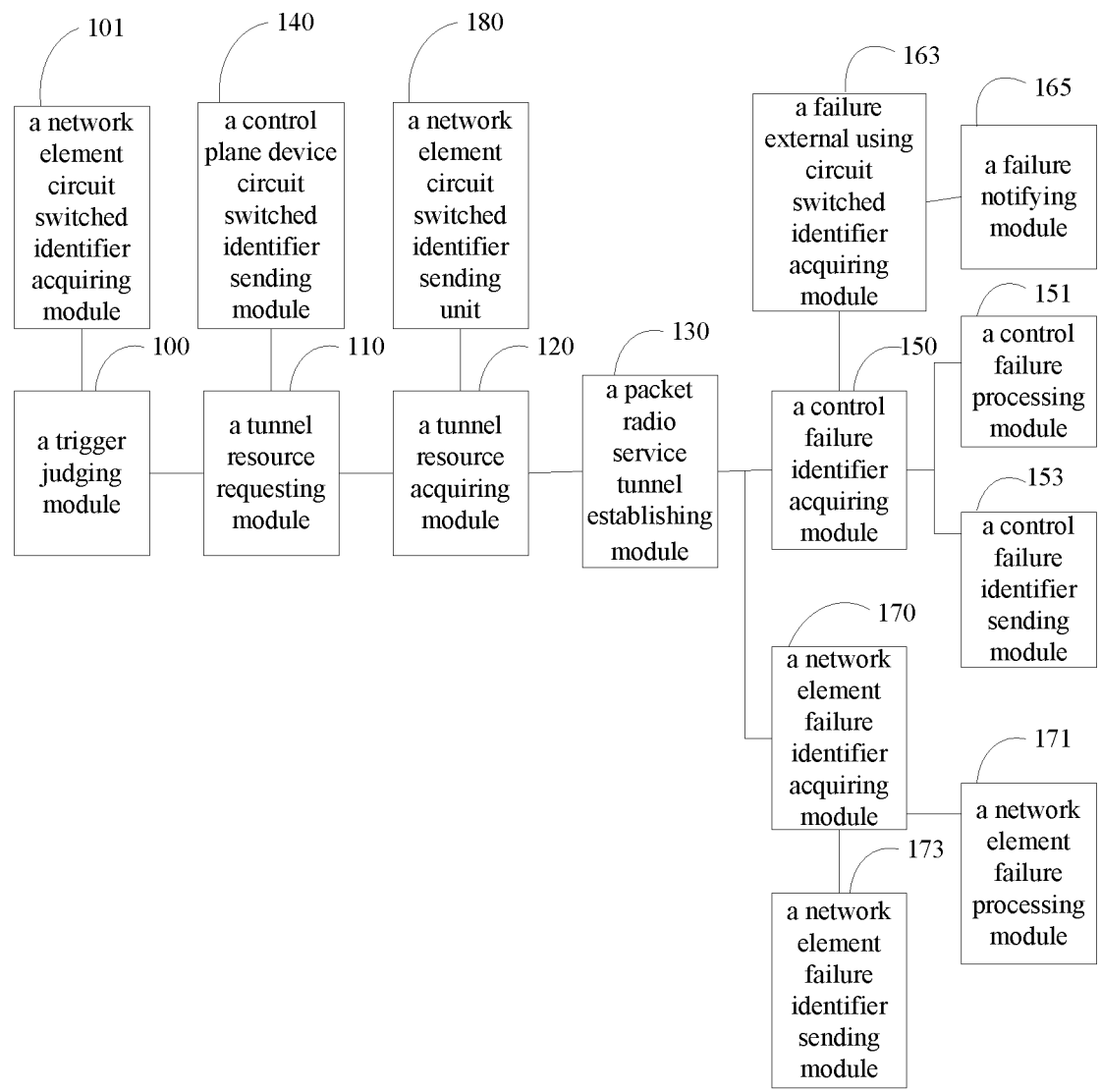
FIG. 3 is a schematic diagram of a structure of a control plane device for managing a forwarding plane tunnel resource in a first embodiment of the present disclosure.

FIG. 3 is a schematic diagram of a structure of a control plane device for managing a forwarding plane tunnel resource in a first embodiment of the present disclosure. The control plane device in the embodiment may be implemented in a radio network controller (RNC), an SGSN and a GGSN in a GPRS network, or an evolved node B (eNodeB), an S-GW, a P-GW and an integrated device of the S-GW and the P-GW in an evolved packet system (EPS) network, or any control and forwarding decoupled GTP, proxy mobile IPv6 (PMIP, including a local mobility anchor LMA, Local Mobility Anchor and a mobile access gateway MAG, Mobile Access Gateway) protocol processing entirety, and even may be completely separated from the forwarding plane device, for example, being singly implemented in an MME. The control plane device in the embodiment as shown in FIG. 3 may include the following modules.

A tunnel resource requesting module 110 is configured to send a forwarding plane tunnel resource request message to a forwarding plane device, for enabling the forwarding plane device to allocate a forwarding plane tunnel resource based on the forwarding plane tunnel resource request message. The forwarding plane tunnel resource request message at least may include a forwarding plane tunnel resource type used for establishing a target packet data network connection.

A tunnel resource acquiring module 120 is configured to acquire the allocated forwarding plane tunnel resource from the forwarding plane device. If the forwarding plane tunnel resource corresponds to a GTP protocol, then it may be forwarding plane IP and TED, and if being corresponding to a PMIPv6 protocol, it is forwarding plane IP and a generic routing encapsulation (GRE) Key.

A packet radio service tunnel establishing module 130 is configured to send the acquired forwarding plane tunnel resource to a target network element, to establish a packet data network connection PDN connection with the target network element.

Furthermore, the control plane device may further include a trigger judging module 100, configured to judge, based on an external or internal trigger condition, whether the forwarding plane tunnel resource needs to be allocated or not. Specifically, the external trigger condition may be that the control plane device is triggered by such signaling negotiation as external GTP-C, PMIP, PCC or the like, and the internal trigger condition is that the control plane device is triggered inside a network element device where the control plane device is located. When the trigger judging module 100 judges that the external or internal trigger condition is satisfied, the tunnel resource requesting module 110 sends the forwarding plane tunnel resource request message to the forwarding plane device based on the satisfied trigger condition, for enabling the forwarding plane device to allocate the forwarding plane tunnel resource corresponding to the satisfied trigger condition. For example, the satisfied trigger condition is an external GTP-C signaling negotiation, then the forwarding plane tunnel resource request message sent by the tunnel resource requesting module 110 to the forwarding plane device needs to request the forwarding plane device to allocate a corresponding GTP tunnel. If the satisfied trigger condition is an external PMIP signaling negotiation, then the forwarding plane tunnel resource request message sent by the tunnel resource requesting module 110 to the forwarding plane device needs to request the forwarding plane device to allocate a PMIPv6 session.

Optionally, the control plane device may further include the following modules.

A control failure identifier acquiring module 150 is configured to acquire, when detecting a failure occurs in itself, a control plane device circuit switched identifier CSID (for convenience of description, CSID-C is configured to express the control plane device circuit switched identifier hereafter) corresponding to the failure. The CSID-C corresponds to a certain GTP protocol processing unit or a PMIP protocol processing unit in the control plane device, for example, may correspond to a cabinet, a frame, a single board, a CPU, a certain core, process or thread of a multi-core CPU and the like.

A control failure processing module 151 is configured to delete all packet data network connections corresponding to the control plane device circuit switched identifier corresponding to the failure.

Optionally, the packet radio service tunnel establishing module 130 is further configured to send an external using circuit switched identifier (for convenience of description, CSID-E is configured to express the external using circuit switched identifier hereafter) corresponding to the forwarding plane tunnel resource to the target network element. The CSID-E in the embodiment is the CSID-C, and the packet radio service tunnel establishing module 130 acquires the CSID-C corresponding to the forwarding plane tunnel resource and the CSID-C serves as CSID-E to send it to the target network element.

And then, the control plane device may further include the following modules.

A failure external using circuit switched identifier acquiring module 163 is configured to acquire, when detecting a failure in itself, an external using circuit switched identifier corresponding to the control plane device circuit switched identifier corresponding to the failure, namely, a failure external using circuit switched identifier. The failure external using circuit switched identifier in the embodiment is the control plane device circuit switched identifier corresponding to the failure.

A failure notifying module 165 is configured to send the failure external using circuit switched identifier acquired by the failure external using circuit switched identifier acquiring module 163 to a target network element associated with the failure external using circuit switched identifier, for enabling the target network element associated with the failure external using circuit switched identifier to delete all packet data network connections corresponding to the failure external using circuit switched identifier.

Optionally, the control plane device may further include the following module.

A control plane device circuit switched identifier sending module 140 is configured to send the control plane device circuit switched identifier corresponding to the forwarding plane tunnel resource request message to the forwarding plane device. In other embodiments, the tunnel resource requesting module 110 and the control plane device circuit switched identifier sending module 140 may be integrated in one module for implementation.

And then, the control plane device may further include the following module.

A control failure identifier sending module 153 is configured to send the control plane device circuit switched identifier, corresponding to the failure and acquired by the control failure identifier acquiring module 150, to the forwarding plane device, for enabling the forwarding plane device to delete all packet data network connections corresponding to the control plane device circuit switched identifier corresponding to the failure. The deletion of all PDN connections mentioned herein includes deletion of all GTP bearers and PMIP sessions or the like corresponding to the PDN connections.

Optionally, the control plane device may further include the following module.

A network element circuit switched identifier acquiring module 101 is configured to acquire an external using circuit switched identifier of the target network element corresponding to the forwarding plane tunnel resource. The network element circuit switched identifier acquiring module 101 may acquire the CSID-E of the target network element through a signaling negotiation with the target network element. In other embodiment, the network element circuit switched identifier acquiring module 101 may be integrated with the trigger judging module 100 in a module for implementation.

And then, the control plane device may further include the following modules.

A network element failure identifier acquiring module 170 is configured to acquire an external using circuit switched identifier corresponding to the failure occurred in the target network element, namely a failure external using circuit switched identifier of the target network element. When sending the failure, the target network element will send a CSID-E corresponding to the failure thereof to the control plane device, and the network element failure identifier acquiring module 170 receives the CSID-E sent by the target network element and corresponding to the failure thereof.

A network element failure processing module 171 is configured to delete all packet data network connections corresponding to the failure external using circuit switched identifier of the target network element.

Optionally, the control plane device may further include:

a network element circuit switched identifier sending unit 180, configured to send the external using circuit switched identifier of the target network element corresponding to the forwarding plane tunnel resource to the forwarding plane device.

And then, the control plane device may further include:

a network element failure identifier sending module 173, configured to send the failure external using circuit switched identifier of the target network element, acquired by the network element failure identifier acquiring module 170, to the forwarding plane device, for enabling the forwarding plane device to delete all the packet data network connections corresponding to the failure external using circuit switched identifier of the target network element.

Figure 4:
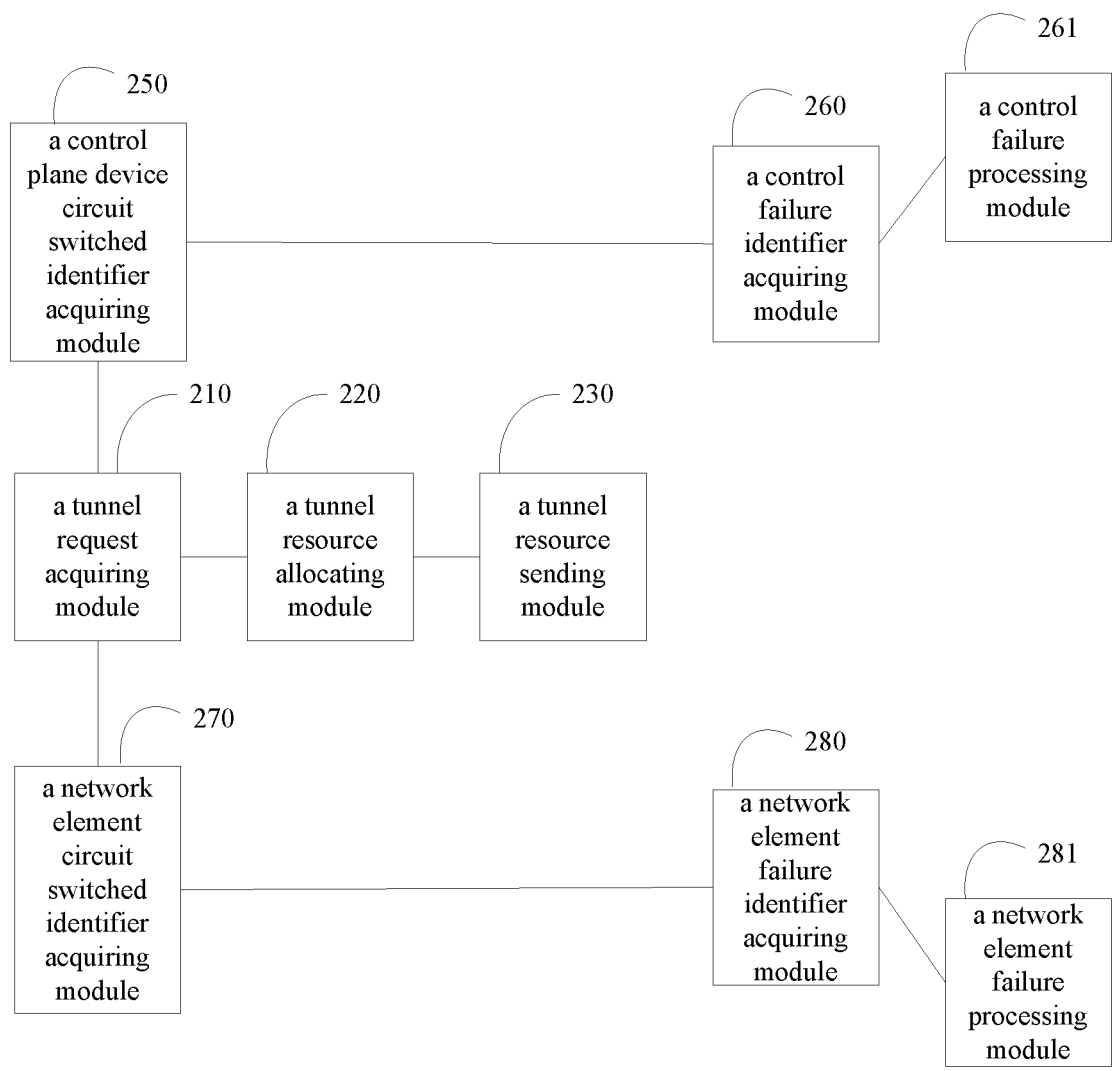
FIG. 4 is a schematic diagram of a structure of a forwarding plane device for managing a forwarding plane tunnel resource in a first embodiment of the present disclosure.

FIG. 4 is a schematic diagram of a structure of a forwarding plane device for managing a forwarding plane tunnel resource in a first embodiment of the present disclosure. The forwarding plane device in the embodiment may be implemented, under a control and forwarding decoupled architecture, in an RNC, an SGSN and a GGSN in a GPRS network or an eNodeB, an S-GW, a P-GW and an integrated device of the S-GW and the P-GW in an EPS network, or any control and forwarding decoupled GTP, PMIP protocol processing entirety. The forwarding plane device in the embodiment as shown in FIG. 4 may include the following modules.

A tunnel request acquiring module 210 is configured to acquire a forwarding plane tunnel resource request message sent by a control plane device. The forwarding plane tunnel resource request message at least may include a forwarding plane tunnel resource type used for establishing a target packet data network connection.

A tunnel resource allocating module 220 is configured to allocate a forwarding plane tunnel resource based on the forwarding plane tunnel resource request message. The tunnel resource allocating module 220 may allocate the forwarding plane tunnel resource based on the forwarding plane tunnel resource request message and the internal load of the forwarding plane device, so as to achieve a load balancing of the forwarding plane device.

A tunnel resource sending module 230 is configured to send the allocated forwarding plane tunnel resource to the control plane device, for enabling the control plane device to send the forwarding plane tunnel resource to a target network element, so as to establish a packet data network connection with the target network element.

Optionally, the forwarding plane device may further include:

a control plane device circuit switched identifier acquiring module 250, configured to acquire a control plane device circuit switched identifier corresponding to the forwarding plane tunnel resource request message from the control plane device. In other embodiment, the control plane device circuit switched identifier acquiring module 250 may be integrated with the tunnel request acquiring module 210 in a module for implementation.

And then, the forwarding plane device may further include the following modules.

A control failure identifier acquiring module 260 is configured to acquire a control plane device circuit switched identifier corresponding to a failure occurred in the control plane device. When sending the failure, the control plane device will send a CSID-C corresponding to the failure thereof, and the control failure identifier acquiring module 260 acquires the CSID-C corresponding to the failure, sent by the control plane device.

A control failure processing module 261 is configured to delete all packet data network connections corresponding to the control plane device circuit switched identifier corresponding to the failure of the control plane device.

Optionally, the forwarding plane device may further include:

a network element circuit switched identifier acquiring module 270, configured to acquire an external using circuit switched identifier of the target network element from the control plane device. In other embodiment, the network element circuit switched identifier acquiring module 270 may be integrated with the tunnel request acquiring module 210 in a module for implementation.

And then, the forwarding plane device may further include the following modules.

A network element failure identifier acquiring module 280, configured to acquire an external using circuit switched identifier corresponding to the failure occurred in the target network element, namely a failure external using circuit switched identifier of the target network element, from the control plane device. When sending the failure, the target network element will send a CSID-E corresponding to the failure thereof to the control plane device, after receiving the CSID-E, the control plane device will forward it to the forwarding plane device, and the network element failure identifier acquiring module 280 acquires the CSID-E corresponding to the failure of the target network element.

A network element failure processing module 281 is configured to delete all packet data network connections corresponding to the failure external using circuit switched identifier of the target network element.

Figure 5:
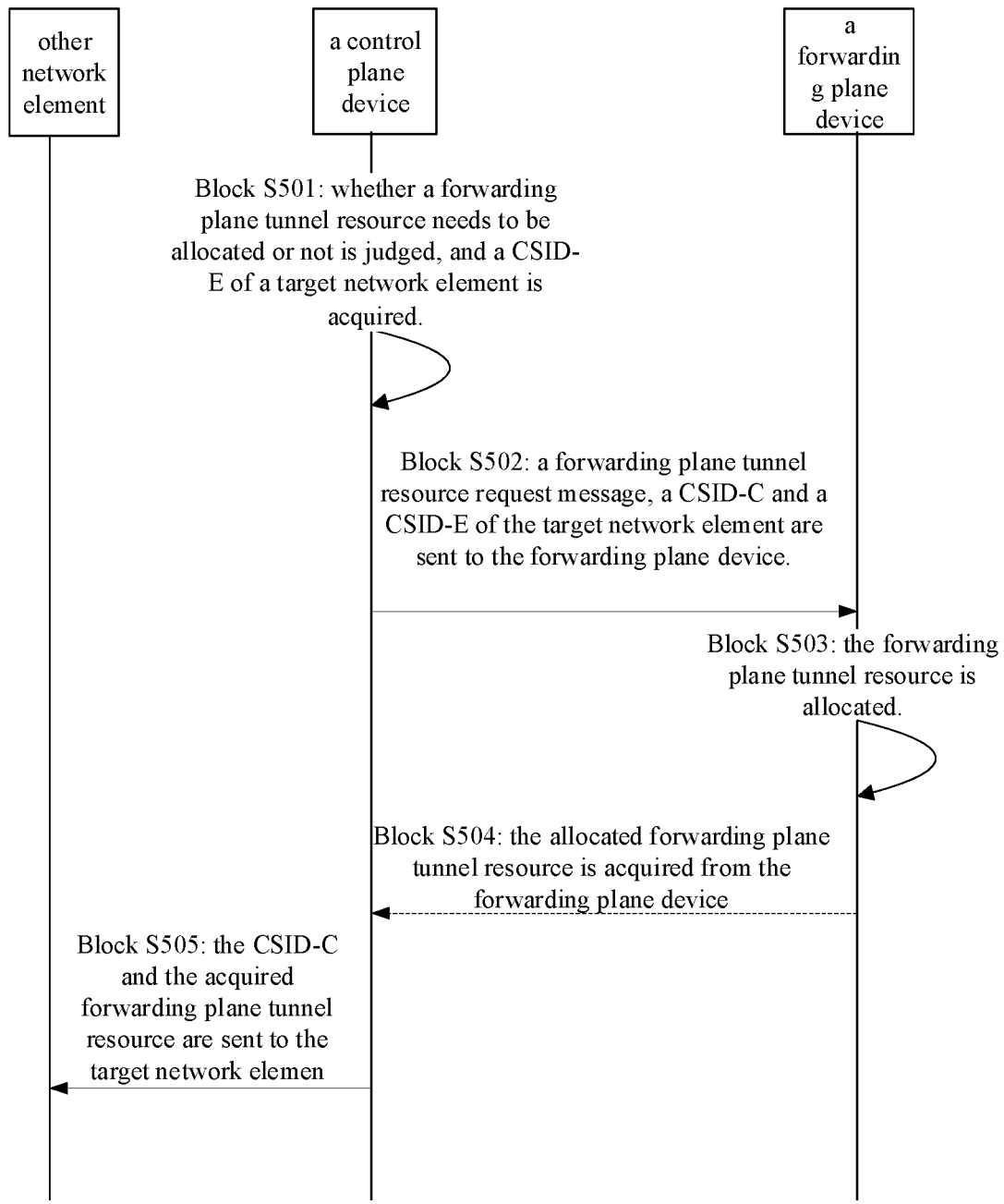
FIG. 5 is a schematic diagram of a flow of establishing a packet data network connection in a method for managing a forwarding plane tunnel resource under a control and forwarding decoupled architecture in a first embodiment of the present disclosure.

FIG. 5 is a flow of a method for establishing a packet data network connection in a first embodiment of the present disclosure. The flow may be implemented, under a control and forwarding decoupled architecture, in an RNC, an SGSN and a GGSN in a GPRS network or an eNodeB, an S-GW, a P-GW and an integrated device of the S-GW and the P-GW in an EPS network, or any control and forwarding decoupled GTP, PMIP protocol processing entirety. The flow of the method for establishing the packet data network connection as shown in FIG. 5 includes the following blocks.

Block S501: a control plane device judges, based on an external or internal trigger condition, whether a forwarding plane tunnel resource needs to be allocated or not, and when judging the external or internal trigger condition is satisfied, an external using circuit switched identifier of a target network element corresponding to a forwarding plane tunnel resource request message is acquired. Specifically, the external trigger condition may be that the control plane device is triggered by such signaling negotiation as external GTP-C, PMIP, PCC or the like, and the internal trigger condition is that the control plane device is triggered inside a network element device where the control plane device is located. In other embodiment, the acquiring the CSID-E of the target network element may be implemented at any moment after block S501 by performing signaling negotiation with the target network element.

Block S502: the control plane device sends the forwarding plane tunnel resource request message, a CSID-C corresponding to the forwarding plane tunnel resource request message and the CSID-E of the target network element to the forwarding plane device. Specifically, the forwarding plane tunnel resource request message may at least include a forwarding plane tunnel resource type used for establishing a target packet data network connection. When judging the external or internal trigger condition is satisfied, the control plane device may send the forwarding plane tunnel resource request message to the forwarding plane device based on the satisfied trigger condition, for enabling the forwarding plane device to allocate a forwarding plane tunnel resource corresponding to the satisfied trigger condition. For example, if the satisfied trigger condition is an external GTP-C signaling negotiation, then the forwarding plane tunnel resource request message sent by the control plane device to the forwarding plane device needs to request the forwarding plane device to allocate a corresponding GTP tunnel. If the satisfied trigger condition is an external PMIP signaling negotiation, then the forwarding plane tunnel resource request message sent by the tunnel resource requesting module 110 to the forwarding plane device needs to request the forwarding plane device to allocate a PMIPv6 session. In other embodiment, the sending the CSID-C corresponding to the forwarding plane tunnel resource request message and the CSID-E of the target network element to the forwarding plane device may also be implemented at any moment after block S502.

Block S503: the forwarding plane device allocates the forwarding plane tunnel resource based on the forwarding plane tunnel resource request message. The forwarding plane device may allocate the forwarding plane tunnel resource based on the forwarding plane tunnel resource request message and the internal load of the forwarding plane device, so as to achieve load balancing of the forwarding plane device. If the forwarding plane tunnel resource corresponds to a GTP protocol, then it may be forwarding plane IP and TEID, and if corresponding to a PMIPv6 protocol, it is forwarding plane IP and a generic routing encapsulation (GRE) Key.

Block S504: the control plane device acquires the allocated forwarding plane tunnel resource from the forwarding plane device.

Block S505: the control plane device sends the CSID-C and the acquired forwarding plane tunnel resource to the target network element, to establish a packet data network connection with the target network element. In the embodiment, the CSID-C is used as CSID-E.

Figure 6:
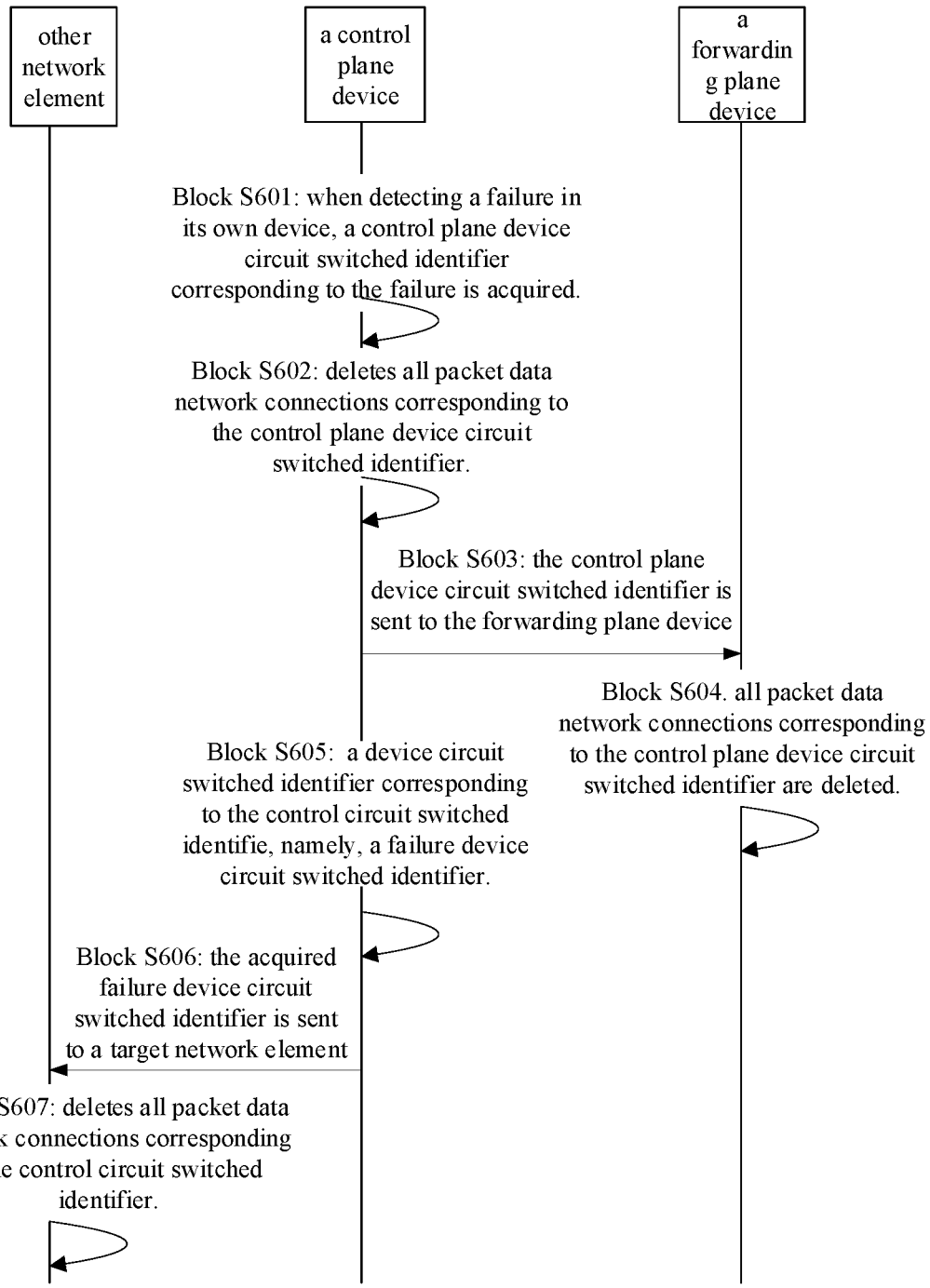
FIG. 6 is a schematic diagram of a flow of a failure processing method in the case of a failure occurred in a control plane device in a method for managing a forwarding plane tunnel resource under a control and forwarding decoupled architecture in a first embodiment of the present disclosure.

FIG. 6 is a schematic diagram of a flow of a failure processing method in the case of a failure occurred in a control plane device in a method for managing a forwarding plane tunnel resource under a control and forwarding decoupled architecture in a first embodiment of the present disclosure. The flow is implemented after the blocks in FIG. 5 are executed. The failure processing flow as shown in FIG. 6 includes the following blocks.

Block S601: when detecting a failure in itself, a control plane device acquires a control plane device circuit switched identifier corresponding to the failure. The CSID-C corresponds to a certain GTP protocol processing unit or a PMIP protocol processing unit in the control plane device, for example, it may correspond to a cabinet, a frame, a single board, a CPU, a certain core, process or thread of a multi-core CPU and the like. When these protocol processing units in the control plane device fail, the control plane device may acquire the CSID-C corresponding to the failure.

Block S602: the control plane device deletes all packet data network connections corresponding to the control plane device circuit switched identifier corresponding to the failure.

Block S603: the control plane device sends the control plane device circuit switched identifier corresponding to the failure to the forwarding plane device.

Block S604: the forwarding plane device deletes all packet data network connections corresponding to the control plane device circuit switched identifier corresponding to the failure of the control plane device.

Block S605: the control plane device acquires an external using circuit switched identifier corresponding to the control plane device circuit switched identifier corresponding to the failure, namely, a failure external using circuit switched identifier. The CSID-E in the embodiment is the CSID-C, thus acquisition of the CSID-E corresponding to the failure is acquisition of the CSID-C corresponding to the failure.

Block S606: the control plane device sends the failure external using circuit switched identifier to a target network element associated with the failure external using circuit switched identifier. The control plane device may firstly search the target network element of the packet data network connection, established by using the CSID-E corresponding to the failure, namely, the target network element associated with the CSID-E corresponding to the failure, and then, send the failure external using circuit switched identifier to the associated target network element.

Block S607: the target network element deletes all packet data network connections corresponding to the failure external using circuit switched identifier.

In other embodiment, the sequence of the three groups of blocks, namely, block S602, block S603 to block S604, and block S605 to block S607 may be mutually exchanged randomly without influencing the implementation effect of the present disclosure.

Figure 7:
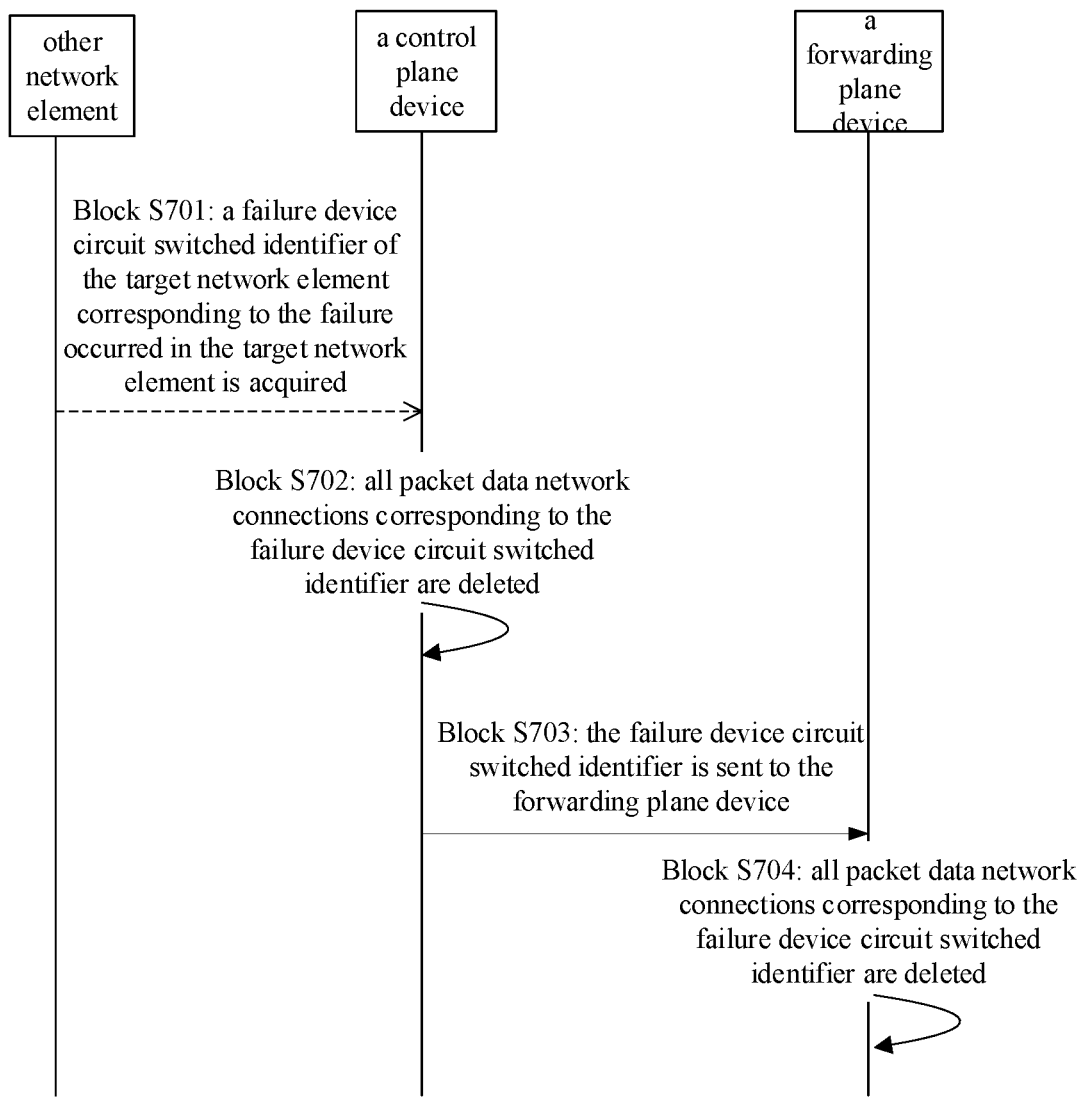
FIG. 7 is a schematic diagram of a flow of a failure processing method in the case of a failure occurred in a target network element in a method for managing a forwarding plane tunnel resource under a control and forwarding decoupled architecture in a first embodiment of the present disclosure.

FIG. 7 is a schematic diagram of a flow of a failure processing method in the case of a failure occurred in a target network element in a method for managing a forwarding plane tunnel resource under a control and forwarding decoupled architecture in a first embodiment of the present disclosure. The flow is implemented after the blocks in FIG. 5 are executed. The failure processing flow as shown in FIG. 7 includes the following blocks.

Block S701: a control plane device acquires an external using circuit switched identifier corresponding to a failure occurred in the target network element, namely, a failure external using circuit switched identifier of the target network element.

Block S702: the control plane device deletes all packet data network connections corresponding to the failure external using circuit switched identifier of the target network element.

Block S703: the failure external using circuit switched identifier of the target network element is sent to the forwarding plane device.

Block S704: the forwarding plane device deletes all packet data network connections corresponding to the failure external using circuit switched identifier of the target network element.

Figure 8:
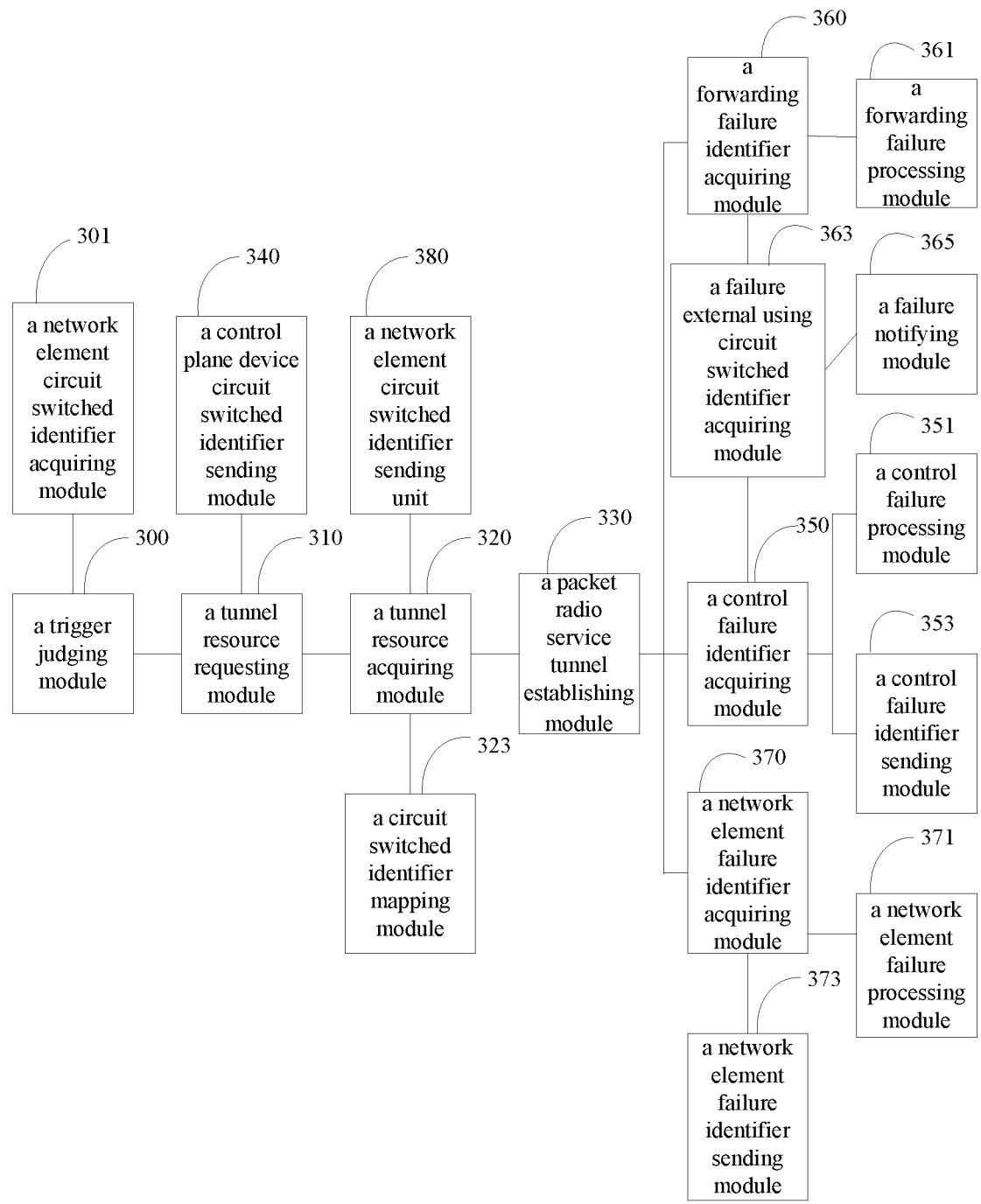
FIG. 8 is a schematic diagram of a structure of a control plane device for managing a forwarding plane tunnel resource in a second embodiment of the present disclosure.

The difference of the second embodiment and the first embodiment lies in that, the forwarding plane device in the second embodiment independently maintains its own CSID-U, so that when the forwarding plane device fails, the failure may be handled quickly. FIG. 8 is a schematic diagram of a structure of a control plane device for managing a forwarding plane tunnel resource in the second embodiment of the present disclosure. The implementation scenario of the control plane device in the embodiment is the same as that of the control plane device in the first embodiment. As shown in the figure, the control plane device in the embodiment may include the following modules.

A trigger judging module 300 and a tunnel resource requesting module 310 are the same as the trigger judging module 100 and the tunnel resource requesting module 110 in the first embodiment, which will not be repeated redundantly herein.

A tunnel resource acquiring module 320 is configured to acquire the allocated forwarding plane tunnel resource from the forwarding plane device, as well as acquire a forwarding plane device circuit switched identifier, corresponding to the forwarding plane tunnel resource, of the forwarding plane device.

A packet radio service tunnel establishing module 330 is configured to send the acquired forwarding plane tunnel resource to a target network element, to establish a packet data network connection PDN connection with the target network element. A packet radio service tunnel establishing module 330 is further used to send an external using circuit switched identifier corresponding to the forwarding plane tunnel resource to the target network element. In the embodiment, the CSID-E sent by the packet radio service tunnel establishing module 330 to the target network element is acquired by a circuit switched identifier mapping module 323 by mapping.

The circuit switched identifier mapping module 323 is configured to acquire a CSID-C corresponding to the forwarding plane tunnel resource request message of the control plane device and map the CSID-C corresponding to the forwarding plane tunnel resource and a CSID-U acquired by the tunnel resource acquiring module 320 to acquire the CSID-E corresponding to the forwarding plane tunnel resource.

A control plane device circuit switched identifier sending module 340, a control failure identifier acquiring module 350, a control failure processing module 351, a control failure identifier sending module 353, a network element circuit switched identifier acquiring module 301, a network element failure identifier acquiring module 370, a network element failure processing module 371, a network element circuit switched identifier sending unit 380 and a network element failure identifier sending module 373 are respectively the same as the corresponding modules in the embodiment, and will not be repeated redundantly herein.

The control plane device in the embodiment further includes the following modules.

A forwarding failure identifier acquiring module 360 is configured to acquire, when the forwarding plane device fails, a forwarding plane device circuit switched identifier corresponding to the failure thereof from the forwarding plane device.

A forwarding failure processing module 361 is configured to delete all packet data network connections corresponding to the forwarding plane device circuit switched identifier corresponding to the failure of the forwarding plane device.

A failure external using circuit switched identifier acquiring module 363 is configured to acquire, when the control failure identifier acquiring module 350 acquires the control plane device circuit switched identifier corresponding to the failure of the control plane device, an external using circuit switched identifier corresponding to the control plane device circuit switched identifier corresponding to the failure of the control plane device, or acquire, when the forwarding failure identifier acquiring module 360 acquires the forwarding plane device circuit switched identifier corresponding to the failure of the forwarding plane device, an external using circuit switched identifier corresponding to the forwarding plane device circuit switched identifier corresponding to the failure of the forwarding plane device, wherein the difference of the CSID-E in the embodiment with that in the first embodiment is no longer being the same as the CSID-C, but the CSID-E is acquired by mapping the CSID-C and the CSID-U corresponding to the same forwarding plane tunnel resource, therefore, if the CSID-C or CSID-U corresponding to the failure is acquired, a unique CSID-E may be acquired.

A failure notifying module 365 is configured to send the external using circuit switched identifier corresponding to the forwarding plane device circuit switched identifier corresponding to the failure occurred in the forwarding plane device, acquired by the failure external using circuit switched identifier acquiring module 363, or the external using circuit switched identifier corresponding to the control plane device circuit switched identifier corresponding to the failure of the control plane device, to the target network element associated with the failure external using circuit switched identifier. Specifically, the failure notifying module 365 may find out the target network element associated with the CSID-E based on the CSID-E acquired by the failure external using circuit switched identifier acquiring module 363, and then send the CSID-E to the associated target network element.

Figure 9:
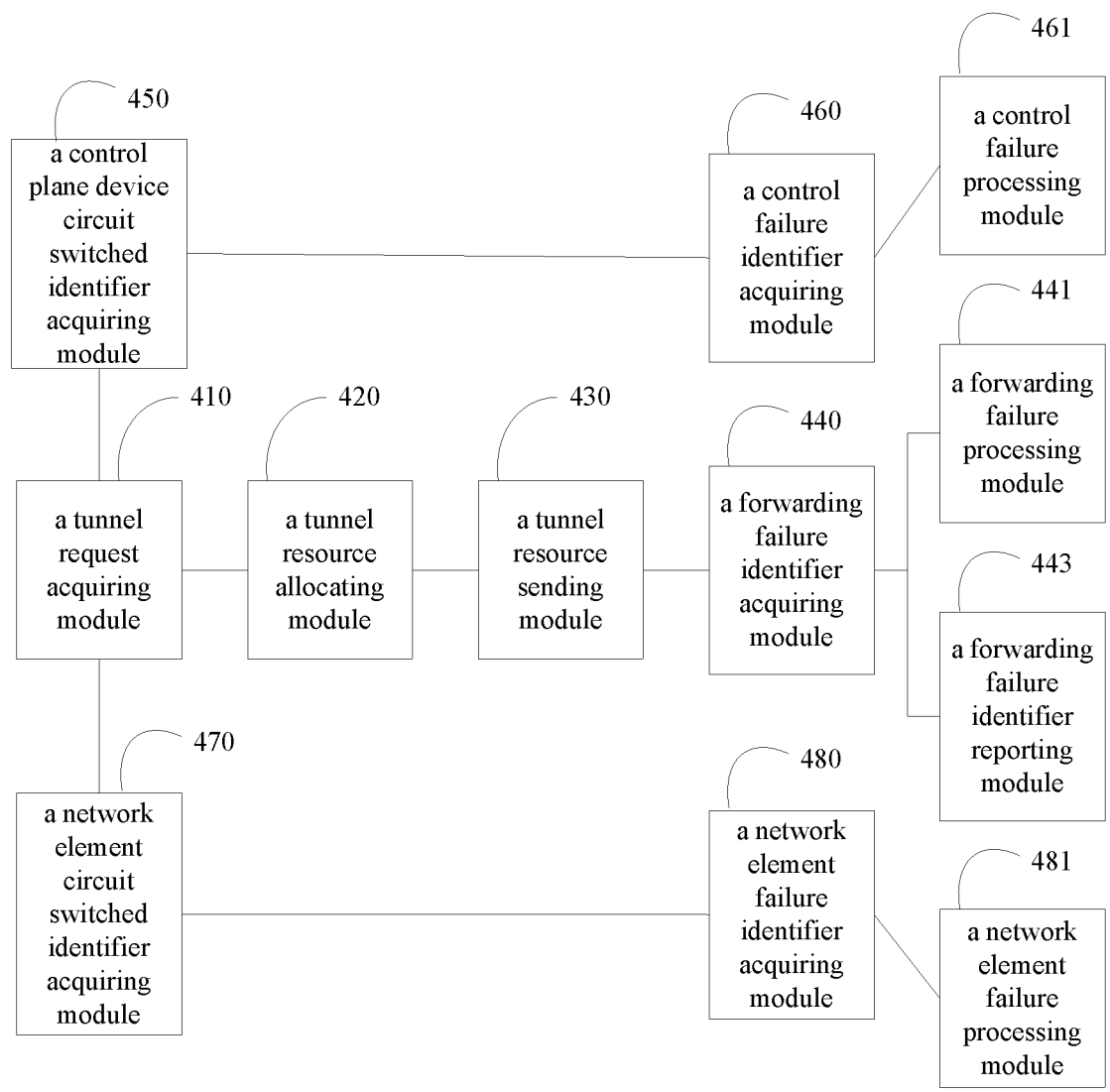
FIG. 9 is a schematic diagram of a structure of a forwarding plane device for managing a forwarding plane tunnel resource in a second embodiment of the present disclosure.

FIG. 9 is a schematic diagram of a structure of a forwarding plane device for managing a forwarding plane tunnel resource in a second embodiment of the present disclosure. The implementation scenario of the forwarding plane device in the embodiment is the same as that of the forwarding plane device in the first embodiment. As shown in the figure, the forwarding plane device in the embodiment may include the following modules.

A tunnel request acquiring module 410 and a tunnel resource allocating module 420 the same as the tunnel request acquiring module 210 and the tunnel resource allocating module 220 in the first embodiment, which will not be repeated redundantly herein.

A tunnel resource sending module 430 is configured to send a forwarding plane tunnel resource allocated by the tunnel resource allocating module 420 and a forwarding plane device circuit switched identifier corresponding to the forwarding plane tunnel resource, to the control plane device.

A control plane device circuit switched identifier acquiring module 450, a control failure identifier acquiring module 460, a control failure processing module 461, a network element circuit switched identifier acquiring module 470, a network element failure identifier acquiring module 480 and a network element failure processing module 481 are respectively the same as the corresponding modules in the first embodiment, and will not be repeated redundantly herein.

The forwarding plane device in the embodiment may further include the following modules.

A forwarding failure identifier acquiring module 440 is configured to acquire, when detecting a failure occurs in its own device, a forwarding plane device circuit switched identifier corresponding to the failure. The CSID-U corresponds to a certain GTP protocol processing unit or a PMIP protocol processing unit in the forwarding plane device, for example, may correspond to a cabinet, a frame, a single board, a CPU, a certain core, process or thread of a multi-core CPU and the like. When these protocol processing units in the forwarding plane device fail, the forwarding failure identifier acquiring module 440 may acquire the CSID-U corresponding to the failure.

A forwarding failure processing module 441 is configured to delete all packet data network connections corresponding to the forwarding plane device circuit switched identifier corresponding to the failure of the forwarding plane device.

A forwarding failure identifier reporting module 443 is configured to send the forwarding plane device circuit switched identifier corresponding to the failure to the control plane device, for enabling the control plane device to delete all packet data network connections corresponding to the control plane device circuit switched identifier corresponding to the failure, and for enabling the control plane device to send an external using circuit switched identifier corresponding to the forwarding plane resource to the target network element.

Figure 10:
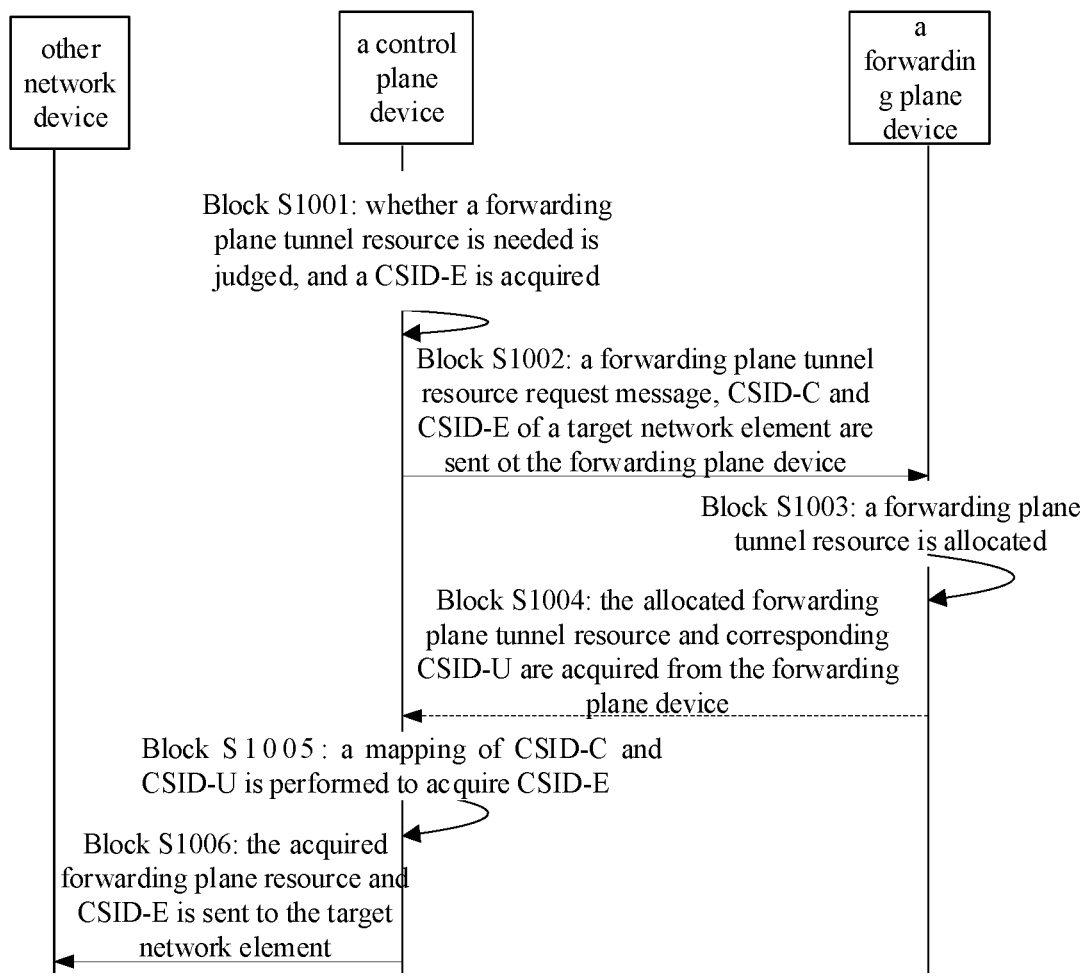
FIG. 10 is a schematic diagram of a flow of establishing a packet data network connection in a method for managing a forwarding plane tunnel resource under a control and forwarding decoupled architecture in a second embodiment of the present disclosure.

FIG. 10 is a schematic diagram of a flow of establishing a packet data network connection in a method for managing a forwarding plane tunnel resource under a control and forwarding decoupled architecture in the second embodiment of the present disclosure. The implementation scenario of the flow is the same as that of the first embodiment, and the flow of establishing the packet data network connection in the embodiment as shown in FIG. 10 includes the following blocks.

Block S1001 to block S1003 are the same as S501 to S503 in the first embodiment, and will not be repeated redundantly herein.

Block S1004: the control plane device acquires the allocated forwarding plane tunnel resource and a forwarding plane device circuit switched identifier CSID-U corresponding to the allocated forwarding plane tunnel resource from the forwarding plane device.

Block S1005: the control plane device performs a mapping of the forwarding plane device circuit switched identifier corresponding to the forwarding plane tunnel resource and the control plane device circuit switched identifier to acquire an external using circuit switched identifier corresponding to the forwarding plane tunnel resource. Namely, the control plane device performs a mapping of the CSID-C and the CSID-U corresponding to the forwarding plane tunnel resource to acquire a CSID-E.

Block S1006: the control plane device sends the external using circuit switched identifier corresponding to the forwarding plane tunnel resource to a target network element, to establish a packet data network connection with the target network element.

In the embodiment of the present disclosure, the failure processing method in the case of failure of the control plane device or the target network element is the same as that in the first embodiment, which will not described repeatedly in the embodiment. In the embodiment, the forwarding plane device independently maintains its own CSID-U, so that when the forwarding plane device fails, a failure processing may be performed in the following flow.

Figure 11:
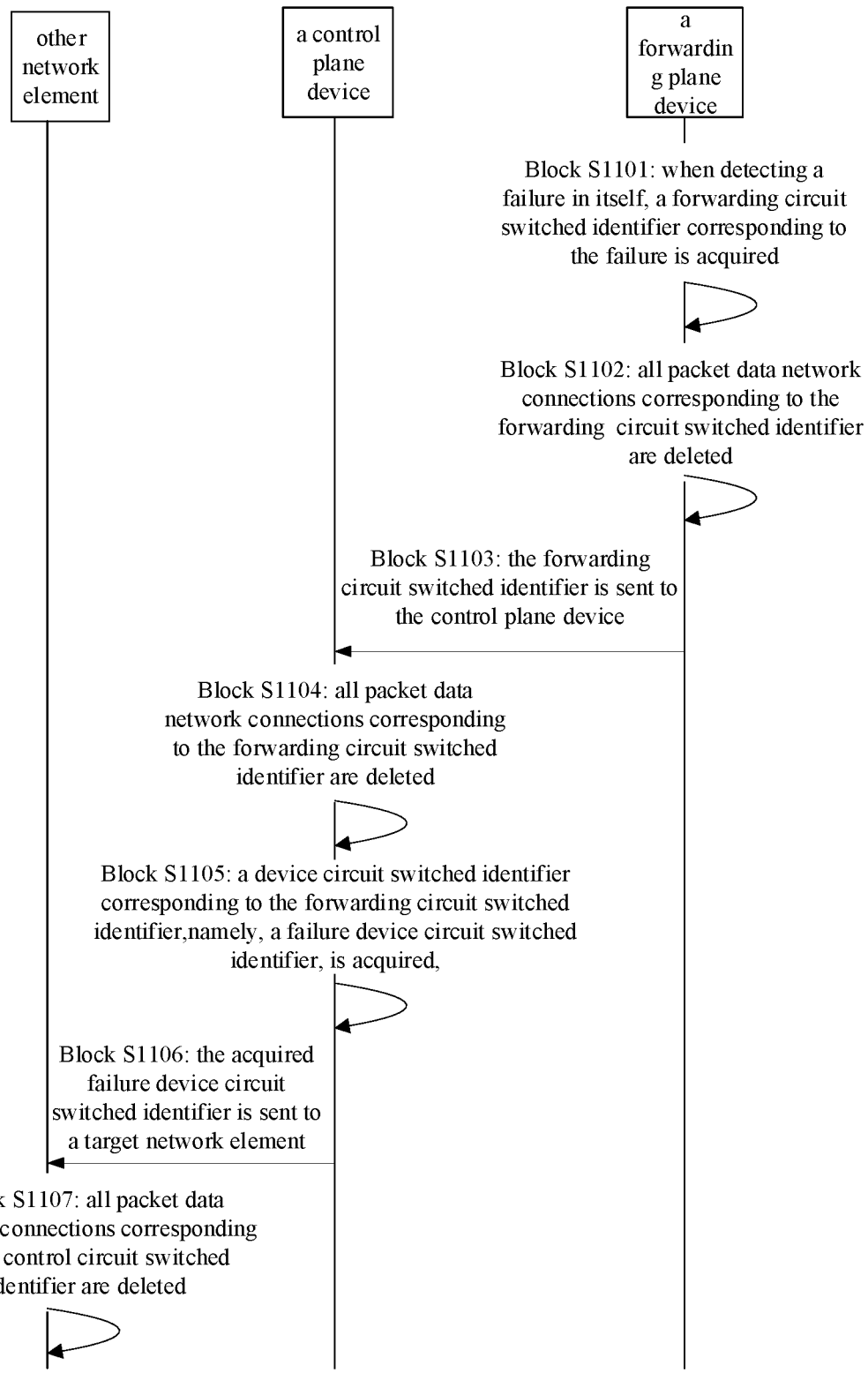
FIG. 11 is a schematic diagram of a flow of a failure processing method in the case of a failure occurred in a forwarding plane device in a second embodiment of the present disclosure.

FIG. 11 is a schematic diagram of a flow of a failure processing method in the case of a failure occurred in a forwarding plane device in the second embodiment of the present disclosure, as shown in the figure, the flow may include the following blocks.

Block S1101: a forwarding plane device acquires, when detecting a failure in itself, a forwarding plane device circuit switched identifier corresponding to the failure. The CSID-U corresponds to a certain GTP protocol processing unit or a PMIP protocol processing unit in the forwarding plane device, for example, may correspond to a cabinet, a frame, a single board, a CPU, a certain core, process or thread of a multi-core CPU and the like. When these protocol processing units in the forwarding plane device fail, the forwarding plane device may acquire the CSID-U corresponding to the failure.

Block S1102: the forwarding plane device deletes all packet data network connections corresponding to the forwarding plane device circuit switched identifier corresponding to the failure.

Block S1103: the forwarding plane device sends the forwarding plane device circuit switched identifier corresponding to the failure to the control plane device.

Block S1104: the control plane device deletes all packet data network connections corresponding to the forwarding plane device circuit switched identifier corresponding to the failure.

Block S1105, the control plane device acquires an external using circuit switched identifier corresponding to the forwarding plane device circuit switched identifier corresponding to the failure, namely, a failure external using circuit switched identifier. The CSID-E in the embodiment is acquired by the control plane device by performing a mapping of the CSID-C and CSID-U corresponding to the same forwarding plane tunnel resource, so that when acquiring the forwarding plane device circuit switched identifier corresponding to the failure occurred in the forwarding plane device, the control plane device may acquire the CSID-E corresponding to the CSID-U.

Block S1106: the control plane device sends the failure external using circuit switched identifier to a target network element associated with the failure external using circuit switched identifier. The control plane device may firstly search the target network element of the packet data network connection, established by using the CSID-E corresponding to the failure, namely, the target network element associated with the CSID-E corresponding to the failure, and then send the failure external using circuit switched identifier to the associated target network element.

Block S1107: the target network element deletes all packet data network connections corresponding to the failure external using circuit switched identifier.

In other embodiment, the sequence of the three groups of blocks, namely block S1102, block S1103 to block S1104, and block S1105 to block S1107 may be mutually exchanged randomly without influencing the implementation effect of the present disclosure.

Figure 12:
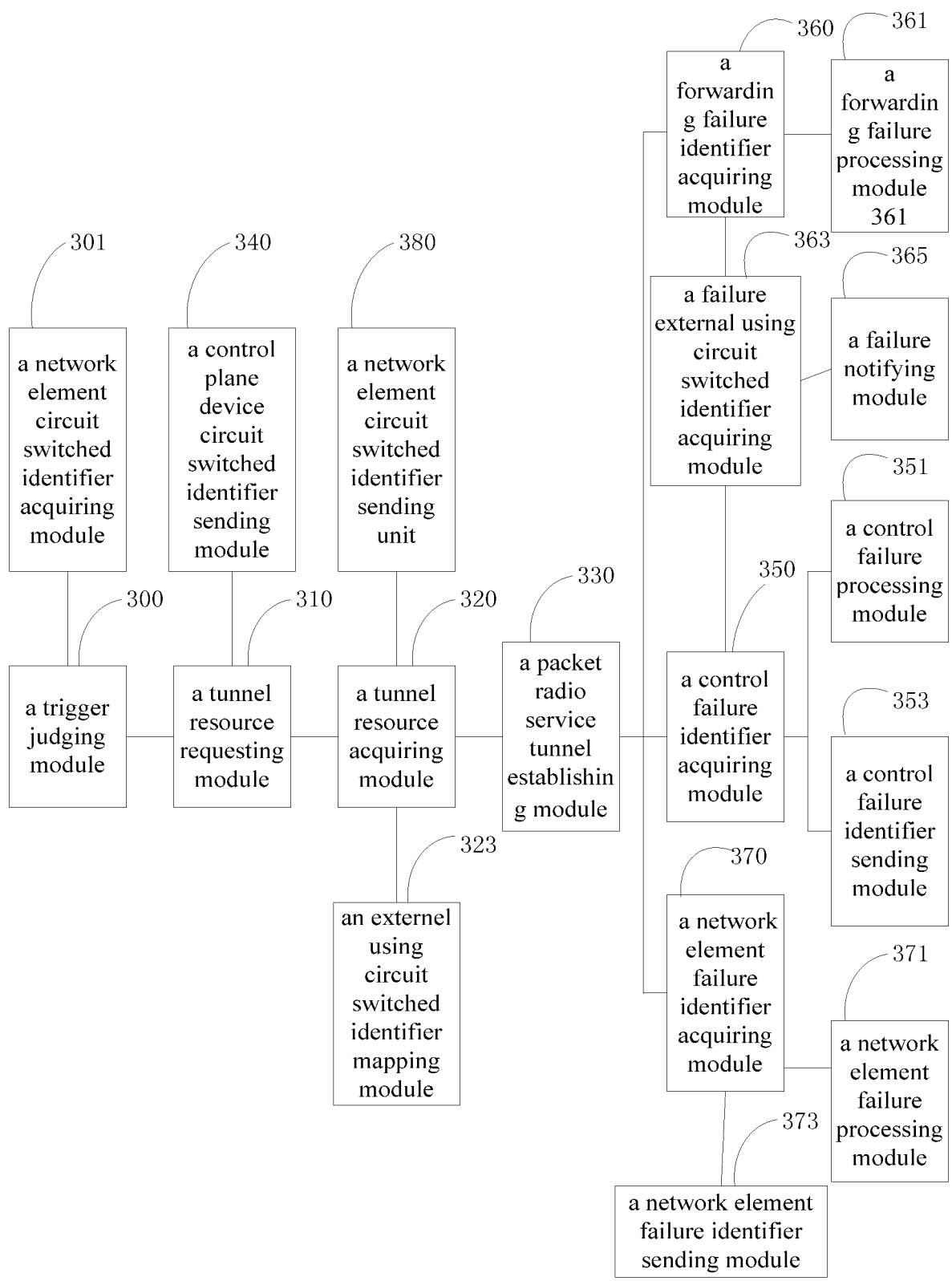
FIG. 12 is a schematic diagram of a structure of a control plane device for managing a forwarding plane tunnel resource in a third embodiment of the present disclosure.

FIG. 12 is a schematic diagram of a structure of a control plane device for managing a forwarding plane tunnel resource in a third embodiment of the present disclosure. The control plane device in the embodiment may be implemented, under a control and forwarding decoupled architecture, in a radio network controller (RNC), an SGSN and a GGSN in a GPRS network, or an evolved node B (eNodeB), an S-GW, a P-GW and an integrated device of the S-GW and the P-GW in an evolved packet system (EPS) network, or any control and forwarding decoupled GTP, proxy mobile IPv6 (PMIP, including a local mobility anchor LMA, Local Mobility Anchor and a mobile access gateway MAG, Mobile Access Gateway) protocol processing entirety, and even may be completely separated from the forwarding plane device, for example, being singly achieved in an MME. The control plane device in the embodiment as shown in FIG. 12 may include the following modules.

A forwarding plane information acquiring module 510 is configured to acquire a set of forwarding plane tunnel resources of a forwarding plane device, and optionally may also configured to acquire a forwarding plane device circuit switched identifier and the processing ability of the forwarding plane device of each forwarding plane device corresponding to the set of forwarding plane tunnel resources. In specific implementation, after a connection is successfully established between the control plane device and the forwarding plane device, the control plane device acquires the set of forwarding plane tunnel resources of the forwarding plane device, corresponding CSID-Us and the processing ability of the forwarding plane device from the forwarding plane device, which may be actively acquired by the control plane device or actively reported by the forwarding plane device. The trigger manner may be periodic acquisition or report, or the one that the control plane device is triggered to acquire as needed or the forwarding plane device is notified to report and the like. For a GTP protocol, the set of forwarding plane tunnel resources may be determined by a forwarding plane IP interval and a TEID interval, wherein the TEID interval may be determined in such manners as initial TEID or TEID+mask and the like. For a PMIP protocol, the set of forwarding plane tunnel resources may be determined by a forwarding plane IP interval and a GRE Key interval, wherein the GRE Key interval may be determined in such manners as initial GRE Key or GRE Key+ mask and the like. Each forwarding plane tunnel resource may correspond to a forwarding plane device circuit switched identifier CSID-U. The processing ability of the forwarding plane device indicates the maximal number of GTP tunnels or PMIP sessions capable of being simultaneously processed by a protocol processing unit corresponding to each CSID-U in the forwarding plane device, and the number may be smaller than or equal to the size of the TEID interval or GRE Key interval. For example, the protocol processing unit corresponding to a CSID-U may simultaneously process 10K GTP tunnels, and to avoid quick circulation of the TEID, the TEID interval of 1M may be allocated. If the processing ability corresponding to the CSID-U is the same as the size of the TEID interval, the processing ability of the forwarding plane device may be omitted, and only the set of forwarding plane tunnel resources and the forwarding plane device circuit switched identifiers of the forwarding plane device are acquired.

A tunnel resource allocating module 520 is configured to allocate a forwarding plane tunnel resource based on the acquired set of forwarding plane tunnel resources. In specific implementation, the tunnel resource allocating module 520 may allocate a proper forwarding plane tunnel resource in the acquired set of forwarding plane tunnel resources based on demand, and optionally, the tunnel resource allocating module 520 may further be configured to acquire the forwarding plane device circuit switched identifier corresponding to the allocated forwarding plane tunnel resource.

A packet radio service tunnel establishing module 530 is configured to send the allocated forwarding plane tunnel resource to a target network element, to establish a packet data network connection PDN connection with the target network element.

Furthermore, the control plane device may further include a trigger judging module 500, configured to judge whether the forwarding plane tunnel resource needs to be allocated or not based on an external or internal trigger condition. Specifically, the external trigger condition may be that the control plane device is triggered by a signaling negotiation such as external GTP-C, PMIP, PCC or the like, and the internal trigger condition is that the control plane device is triggered inside a network element device where the control plane device is located. When the trigger judging module 500 judges that the external or internal trigger condition is satisfied, the tunnel resource allocating module 520 allocates a forwarding plane tunnel resource corresponding to the satisfied trigger condition, based on the satisfied trigger condition. For example, the satisfied trigger condition is an external GTP-C signaling negotiation, then the tunnel resource allocating module 520 needs to allocate a corresponding GTP tunnel. If the satisfied trigger condition is an external PMIP signaling negotiation, then the tunnel resource allocating module 520 needs to allocate a PMIPv6 session.

Optionally, the control plane device in the embodiment may further include the following modules.

A control failure identifier acquiring module 550 is configured to acquire, when detecting a failure occurs in its own device, a control plane device circuit switched identifier corresponding to the failure, wherein the CSID-C corresponds to a certain GTP protocol processing unit or a PMIP protocol processing unit in the control plane device, for example, it may correspond to a cabinet, a frame, a single board, a CPU, a certain core, process or thread of a multi-core CPU and the like.

A control failure processing module 551 is configured to delete all packet data network connections corresponding to the control plane device circuit switched identifier corresponding to the failure.

Optionally, the control plane device in the embodiment may further include the following modules.

A forwarding failure identifier acquiring module 560 is configured to acquire, when the forwarding plane device fails, a forwarding plane device circuit switched identifier corresponding to the failure from the forwarding plane device.

A forwarding failure processing module 561 is configured to delete all packet data network connections corresponding to the forwarding plane device circuit switched identifier corresponding to the failure of the forwarding plane device.

Optionally, the packet radio service tunnel establishing module 530 is further configured to send an external using circuit switched identifier (for convenience of description, CSID-E is configured to express the external using circuit switched identifier hereafter) corresponding to the forwarding plane tunnel resource to the target network element. In the embodiment, the CSID-E sent by the packet radio service tunnel establishing module 530 to the target network element is acquired by a circuit switched identifier mapping module 523 by perform a mapping. In other embodiment, the CSID-C may be used as CSID-E as well.

The circuit switched identifier mapping module 523 is configured to acquire a CSID-C corresponding to the forwarding plane tunnel resource request message of the control plane device and performs a mapping of the CSID-C corresponding to the forwarding plane tunnel resource and a CSID-U acquired by the tunnel resource acquiring module 520 to acquire a CSID-E corresponding to the forwarding plane tunnel resource.

And then, the control plane device may further include the following modules.

A failure external using circuit switched identifier acquiring module 563 is configured to acquire, when the control failure identifier acquiring module 550 acquires the control plane device circuit switched identifier corresponding to the failure of the control plane device, an external using circuit switched identifier corresponding to the control plane device circuit switched identifier corresponding to the failure of the control plane device, or acquire, when the forwarding failure identifier acquiring module 560 acquires the forwarding plane device circuit switched identifier corresponding to the failure of the forwarding plane device, an external using circuit switched identifier corresponding to the forwarding plane device circuit switched identifier corresponding to the failure of the forwarding plane device, wherein the CSID-E in the embodiment is acquired by performing a mapping of the CSID-C and the CSID-U corresponding to the same forwarding plane tunnel resource, therefore, if the CSID-C or CSID-U corresponding to the failure is acquired, a unique CSID-E may be acquired. In other embodiment, the CSID-C may be used as CSID-E as well.

A failure notifying module 565 is configured to send the external using circuit switched identifier corresponding to the forwarding plane device circuit switched identifier corresponding to the failure of the forwarding plane device, acquired by the failure external using circuit switched identifier acquiring module 563, or the external using circuit switched identifier corresponding to the control plane device circuit switched identifier corresponding to the failure occurred in the control plane device, to the target network element associated with the failure external using circuit switched identifier. Specifically, the failure notifying module 565 may find out the target network element associated with the CSID-E based on the CSID-E acquired by the failure external using circuit switched identifier acquiring module 563, and then send the CSID-E to the associated target network element.

Optionally, the control plane device may further include:
A control plane device circuit switched identifier sending module 540, configured to send the control plane device circuit switched identifier corresponding to the allocated forwarding plane tunnel resource to the forwarding plane device.

And then, the control plane device may further include:
a control failure identifier sending module 553, configured to send the control plane device circuit switched identifier corresponding to the failure, which is acquired by the control failure identifier acquiring module 550, to the forwarding plane device, for enabling the forwarding plane device to delete all packet data network connections corresponding to the control plane device circuit switched identifier corresponding to the failure.

Optionally, the control plane device may further include:
a network element circuit switched identifier acquiring module 501, configured to acquire an external using circuit switched identifier of the target network element corresponding to the allocated forwarding plane tunnel resource. The network element circuit switched identifier acquiring module 501 may acquire the CSID-E of the target network element through a signaling negotiation with the target network element. In other embodiment, the network element circuit switched identifier acquiring module 501 may be integrated with the trigger judging module 500 in a module for implementation.

And then, the control plane device may further include the following modules.

a network element failure identifier acquiring module 570 is configured to acquire an external using circuit switched identifier corresponding to the failure occurred in the target network element, namely a failure external using circuit switched identifier of the target network element. When sending the failure, the target network element will send a CSID-E corresponding to the failure thereof to the control plane device, and the network element failure identifier acquiring module 570 receives the CSID-E sent by the target network element and corresponding to the failure thereof.

A network element failure processing module 571 is configured to delete all packet data network connections corresponding to the failure external using circuit switched identifier of the target network element.

Optionally, the control plane device may further include:
a network element circuit switched identifier sending unit 580, configured to send the external using circuit switched identifier of the target network element corresponding to the forwarding plane tunnel resource to the forwarding plane device.

And then, the control plane device may further include:
a network element failure identifier sending module 573, configured to send the failure external using circuit switched identifier of the target network element, acquired by the network element failure identifier acquiring module 570, to the forwarding plane device, for enabling the forwarding plane device to delete all the packet data network connections corresponding to the failure external using circuit switched identifier of the target network element.

Figure 13:
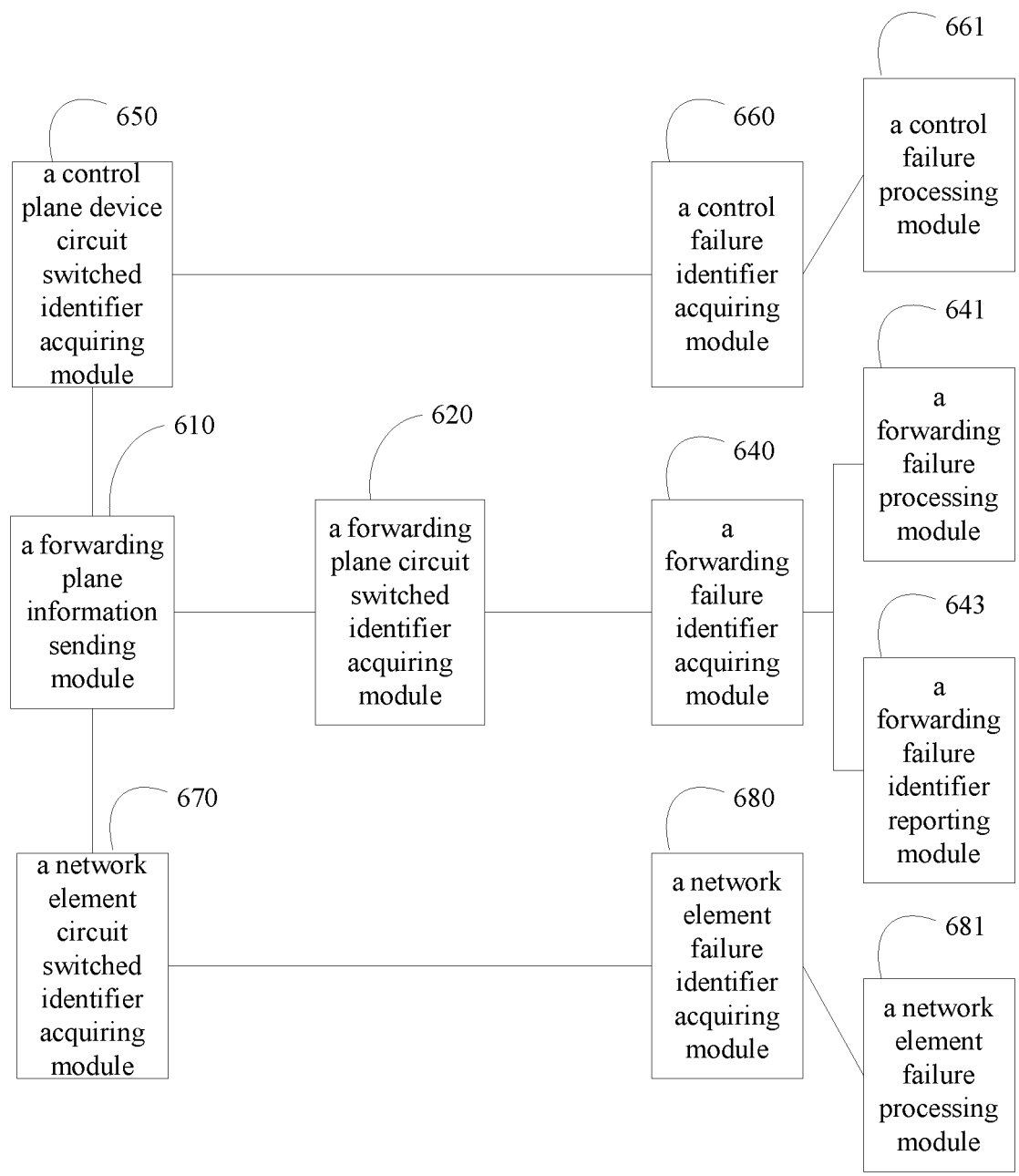
FIG. 13 is a schematic diagram of a structure of a forwarding plane device for managing a forwarding plane tunnel resource in a third embodiment of the present disclosure.

FIG. 13 is a schematic diagram of a structure of a forwarding plane device for managing a forwarding plane tunnel resource in a third embodiment of the present disclosure. The implementation scenario of the forwarding plane device in the embodiment is the same as that of the forwarding plane device in the first embodiment, and the forwarding plane device in the embodiment as shown in the figure may include:
a forwarding plane information sending module 610, configured to send a set of forwarding plane tunnel resources of the forwarding plane device to the control plane device, and optionally may also be configured to send a forwarding plane device circuit switched identifier of each forwarding plane device and the processing ability of the forwarding plane device corresponding to the set of forwarding plane tunnel resources. In specific implementation, after a connection is successfully established between the control plane device and the forwarding plane device, the control plane device acquires the set of forwarding plane tunnel resources, corresponding CSID-Us and the processing ability of the forwarding plane device from the forwarding plane device, which may be actively acquired by the control plane device or actively reported by the forwarding plane device. The trigger manner may be periodic acquisition or report, or the one that the control plane device is triggered to acquire as needed or the forwarding plane device is notified to report and the like. For a GTP protocol, the set of forwarding plane tunnel resources may be determined by a forwarding plane IP interval and a TEID interval, wherein the TEID interval may be determined in such manners as initial TEID or TEID+mask and the like. For a PMIP protocol, the set of forwarding plane tunnel resources may be determined by a forwarding plane IP interval and a GRE Key interval, wherein the GRE Key interval may be determined in such manners as initial GRE Key or GRE Key+mask and the like. Each forwarding plane tunnel resource may correspond to a forwarding plane device circuit switched identifier CSID-U. The processing ability of the forwarding plane device indicates the maximal number of GTP tunnels or PMIP sessions capable of being simultaneously processed by a protocol processing unit corresponding to each CSID-U in the forwarding plane device, and the number may be smaller than or equal to the size of the TEID interval or GRE Key interval. For example, the protocol processing unit corresponding to a CSID-U may simultaneously process 10K GTP tunnels, and to avoid quick circulation of the TEID, the TEID interval of 1M may be allocated. If the processing ability corresponding to the CSID-U is the same as the size of the TEID interval, the processing ability of the forwarding plane device may be omitted, and the forwarding plane information sending module 610 only sends the set of forwarding plane tunnel resources and the forwarding plane device circuit switched identifiers of the forwarding plane device.

Optionally, the forwarding plane device in the embodiment may further include the following modules.

A control plane device circuit switched identifier acquiring module 650 is configured to acquire the allocated forwarding plane tunnel resource and a corresponding control plane device circuit switched identifier from the control plane device. In this way, the forwarding plane device learns about the control plane device circuit switched identifier corresponding to its own allocated forwarding plane tunnel resource.

A network element circuit switched identifier acquiring module 670 is configured to acquire an external using circuit switched identifier of the target network element corresponding to the allocated forwarding plane tunnel resource from the control plane device. In this way, the forwarding plane device learns about the external using circuit switched identifier of the target network element corresponding to its own allocated forwarding plane tunnel resource. Furthermore, in other optional embodiment, a forwarding plane circuit switched identifier acquiring module 620, the control plane device circuit switched identifier acquiring module 650 and the network element circuit switched identifier acquiring module 670 may be integrated in a module for implementation.

And then, a forwarding failure identifier acquiring module 640, a forwarding failure processing module 641, a forwarding failure identifier reporting module 643, a control failure identifier acquiring module 660, a control failure processing module 661, a network element failure identifier acquiring module 680 and a network element failure processing module 681 are the same as the corresponding modules in the forwarding plane device of the second embodiment, and will not be repeated in the embodiment.

Figure 14:
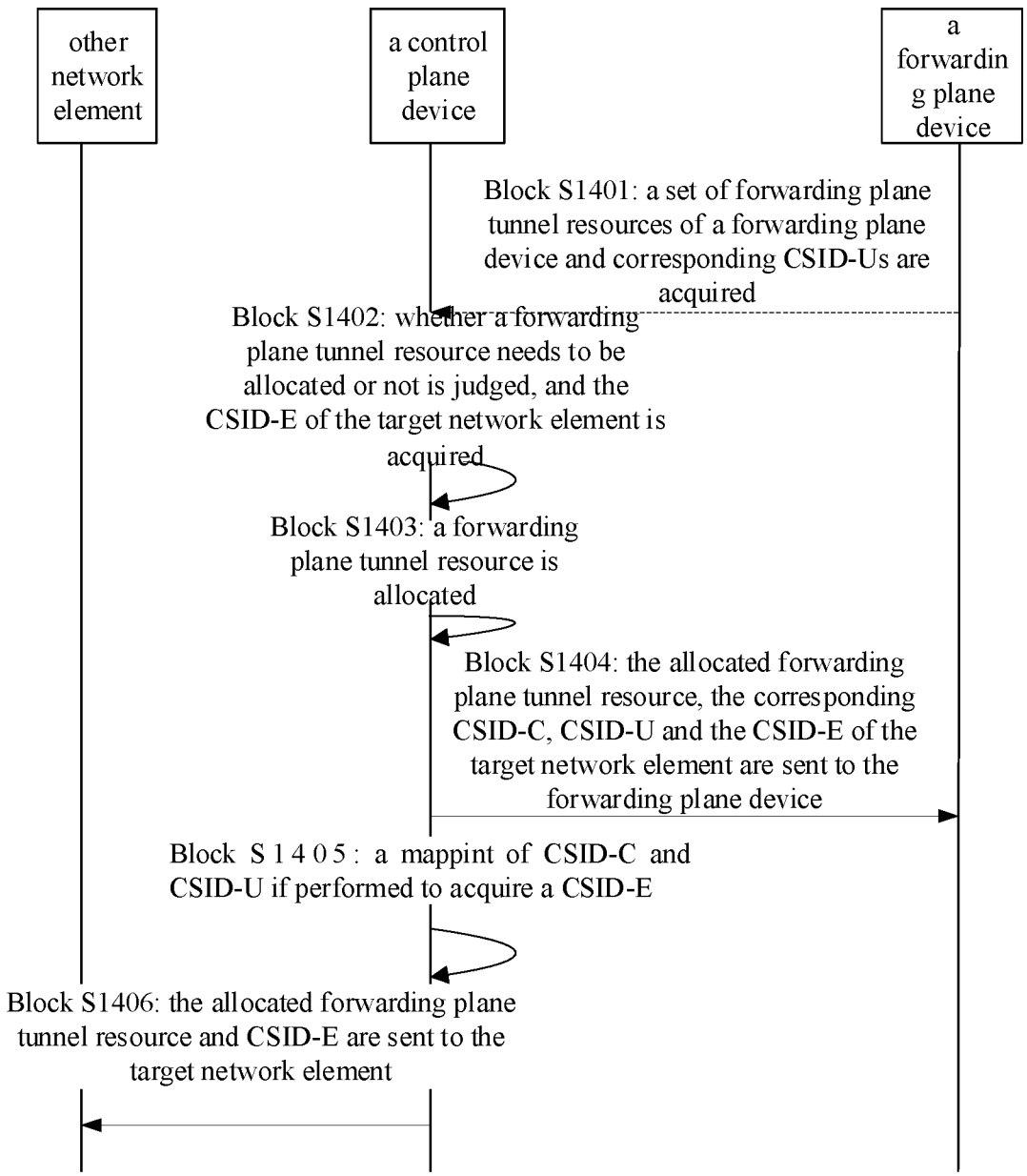
FIG. 14 is a schematic diagram of a flow of establishing a packet data network connection in a method for managing a forwarding plane tunnel resource under a control and forwarding decoupled architecture in a third embodiment of the present disclosure.

FIG. 14 is a schematic diagram of a flow of establishing a packet data network connection in a method for managing a forwarding plane tunnel resource under a control and forwarding decoupled architecture in a third embodiment of the present disclosure. The implementation scenario of the flow is the same as that in the first embodiment. The flow of establishing the packet data network connection in the embodiment as shown in FIG. 14 includes the following blocks.

Block S1401: a set of forwarding plane tunnel resources of a forwarding plane device is acquired. Optionally, a forwarding plane device circuit switched identifier of each forwarding plane device and the processing ability of the forwarding plane device corresponding to the set of forwarding plane tunnel resources are acquired. In specific implementation, after a connection is successfully established between the control plane device and the forwarding plane device, the control plane device acquires the set of forwarding plane tunnel resources, corresponding CSID-Us and the processing ability of the forwarding plane device from the forwarding plane device, which may be actively acquired by the control plane device or actively reported by the forwarding plane device. The trigger manner may be periodic acquisition or report, or the one that the control plane device is triggered to acquire as needed or the forwarding plane device is notified to report and the like. For a GTP protocol, the set of forwarding plane tunnel resources may be determined by a forwarding plane IP interval and a TED interval, wherein the TED interval may be determined in such manners as initial TEID or TEID+mask and the like. For a PMIP protocol, the set of forwarding plane tunnel resources may be determined by a forwarding plane IP interval and a GRE Key interval, wherein the GRE Key interval may be determined in such manners as initial GRE Key or GRE Key+mask and the like. Each forwarding plane tunnel resource may correspond to a forwarding plane device circuit switched identifier CSID-U. The processing ability of the forwarding plane device indicates the maximal number of GTP tunnels or PMIP sessions capable of being simultaneously processed by a protocol processing unit corresponding to each CSID-U in the forwarding plane device, and the number may be smaller than or equal to the size of the TEID interval or GRE Key interval. For example, the protocol processing unit corresponding to a CSID-U may simultaneously process 10K GTP tunnels, and to avoid quick circulation of the TEID, the TEID interval of 1M may be allocated. If the processing ability corresponding to the CSID-U is the same as the size of the TEID interval, the processing ability of the forwarding plane device may be omitted, and only the set of forwarding plane tunnel resources of the forwarding plane device and the forwarding plane device circuit switched identifiers are acquired.

Block S1402: the control plane device judges, based on an external or internal trigger condition, whether a forwarding plane tunnel resource needs to be allocated or not, and when judging the external or internal trigger condition is satisfied, an external using circuit switched identifier corresponding to the forwarding plane tunnel resource request message is acquired. Specifically, the external trigger condition may be that the control plane device is triggered by such signaling negotiation as external GTP-C, PMIP, PCC or the like, and the internal trigger condition is that the control plane device is triggered inside a network element device where the control plane device is located. In other embodiments, the acquiring the CSID-E of the target network element may be implemented at any moment after block S1402 by performing a signaling negotiation with the target network element.

S1403: when the control plane device judges the external or internal trigger condition is satisfied, a forwarding plane tunnel resource corresponding to the satisfied trigger condition may be allocated based on the satisfied trigger condition and the set of forwarding plane tunnel resources acquired in block S1401. For example, the satisfied trigger condition is an external GTP-C signaling negotiation, then the control plane device correspondingly allocates a corresponding GTP tunnel. If the satisfied trigger condition is an external PMIP signaling negotiation, then the control plane device correspondingly allocates a PMIPv6 session.

Block S1404: the control plane device sends the allocated forwarding plane tunnel resource, the corresponding control plane device circuit switched identifier, the forwarding plane device circuit switched identifier and the external using circuit switched identifier of the target network element to the forwarding plane device, so as to notify the forwarding plane device of the CSID-U and CSID-C, which are corresponding to the allocated forwarding plane tunnel resource, and the CSID-E of the target network element.

Block S1405: a mapping of the forwarding plane device circuit switched identifier and the control plane device circuit switched identifier corresponding to the allocated forwarding plane tunnel resource is performed to acquire an external using circuit switched identifier corresponding to the allocated forwarding plane tunnel resource. Optionally, when the forwarding plane device does not independently maintain its own CSID-U, the CSID-C of the control plane device may be directly adopted as CSID-E as well.

Block S1046: the allocated forwarding plane tunnel resource and the external using circuit switched identifier corresponding to the allocated forwarding plane tunnel resource are sent to the target network element, to establish a packet data network connection with the target network element.

In the embodiment, the flow of the failure processing method in the case of a failure of the control plane device or the target network element is the same as that in the first embodiment, and the failure processing method in the case of a failure of the forwarding plane device is the same as that in the second embodiment, and will not be repeated redundantly herein.

In the embodiment of the present disclosure, the load balancing of the forwarding plane device is achieved, and the signaling interaction between the control plane device and the forwarding plane device is reduced as much as possible, and meanwhile, the control plane device maintains its own CSID-C by means of reasonable allocation of the forwarding plane tunnel resources, thus efficient failure processing can be achieved in the case of device failure.

Those of ordinary skill in the art may understand that all or a part of the procedures in the above-mentioned embodiments of a method may be implemented with a computer program instructing relevant hardware, the foregoing program may be stored in a computer readable storage medium, and when being executed, the program may include the flows of the embodiments of the above-mentioned methods, wherein the storage medium may be a magnetic disk, an optical disk, a read-only memory (ROM), a random access memory (RAM) or the like.

The foregoing descriptions are merely preferred embodiments of the present disclosure, but the protection scope of the present disclosure is not limited thereto. Those of ordinary skill in the art should understand that realization for all or part of flows in the above-mentioned embodiments and the equivalent variations made according to the claims of the present disclosure still fall in the scope encompassed by the present disclosure.

What is claimed is:

1. A non-transitory computer readable storage medium, storing processor-readable instructions, which when executed by a processor of a control plane device, cause the processor to perform operations comprising:
    when an internal condition is satisfied, sending a forwarding plane tunnel resource request message to a forwarding plane device in a communication system, in the communication system a control plane and a forwarding plane being decoupled;
    acquiring an identifier of an allocated forwarding plane tunnel resource from the forwarding plane device, wherein the acquired forwarding plane tunnel resource is allocated in response to the forwarding plane tunnel resource request message;
    sending the identifier of the forwarding plane tunnel resource to a target network element, wherein the identifier of the forwarding plane tunnel resource is used to establish a packet data network connection with the target network element;
    when the control plane device detects a failure of a component in the control plane device, acquiring a first identifier corresponding to the failure, wherein the first identifier corresponds to the component within the control plane device;
    deleting all packet data network connections corresponding to the first identifier;
    acquiring a second identifier based on the first identifier, wherein the second identifier is associated with a target network element; and
    sending the second identifier to the target network element associated with the second identifier, to enable the target network element associated with the second identifier to delete all packet data network connections corresponding to the second identifier.

2. The non-transitory computer readable storage medium of claim 1, wherein the processor-readable instructions cause the processor to perform further operations comprising:
    sending an external using circuit switched identifier corresponding to the forwarding plane tunnel resource to the target network element.

3. The non-transitory computer readable storage medium of claim 2, wherein the processor-readable instructions cause the processor to perform further operations comprising:
    acquiring a forwarding plane device circuit switched identifier of the forwarding plane device, which corresponds to the forwarding plane tunnel resource;
    acquiring a third identifier of the control plane device, which corresponds to the forwarding plane tunnel resource request message; and
    performing a mapping of the forwarding plane device circuit switched identifier and the third identifier, which corresponds to the forwarding plane tunnel resource, to acquire the external using circuit switched identifier corresponding to the forwarding plane tunnel resource.

4. A non-transitory computer readable storage medium, storing processor-readable instructions, which when executed by a processor of a forwarding plane device, cause the processor to perform operations comprising:
  acquiring a forwarding plane tunnel resource request message from a control plane device in a communication system, in the communication system a control plane and a forwarding plane being decoupled;
  allocating a forwarding plane tunnel resource based on the forwarding plane tunnel resource request message;
  sending an identifier of the allocated forwarding plane tunnel resource to the control plane device, wherein the identifier of the allocated forwarding plane tunnel resource is used to establish a packet data network connection with a target network element;
  acquiring a first identifier corresponding to a failure that occurred in the target network element, from the control plane device, wherein the first identifier corresponds to a device that is external to the control plane device; and
  deleting all packet data network connections corresponding to the first identifier of the target network element.

5. The non-transitory computer readable storage medium of claim 4, wherein sending the identifier of the allocated forwarding plane tunnel resource comprises:
  sending a forwarding plane device circuit switched identifier corresponding to the forwarding plane tunnel resource to the control plane device.

6. The non-transitory computer readable storage medium of claim 5, wherein the sending the identifier of the allocated forwarding plane tunnel resource further comprises:
  enabling the control plane device to send an external using circuit switched identifier corresponding to the forwarding plane tunnel resource to the target network element.

7. The non-transitory computer readable storage medium claim 4, wherein the processor-readable instructions cause the processor to perform further operations comprising:
  acquiring a second identifier corresponding to the forwarding plane tunnel resource request message from the control plane device.

8. The non-transitory computer readable storage medium of claim 4, wherein the processor-readable instructions cause the processor to perform operations further comprising:
  acquiring an external using circuit switched identifier of the target network element from the control plane device.

9. A method for managing a resource, the method comprising:
  acquiring, by a forwarding plane device, a forwarding plane tunnel resource request message from a control plane device, wherein the forwarding plane device is in a communication system, in the communication system a control plane and a forwarding plane being decoupled;
  allocating, by the forwarding plane device, a forwarding plane tunnel resource based on the forwarding plane tunnel resource request message; sending, by the forwarding plane device, an identifier of the allocated forwarding plane tunnel resource to the control plane device, wherein the identifier of the allocated forwarding plane tunnel resource is used to establish a packet data network connection with a target network element;
  acquiring a first identifier corresponding to a failure that occurred in the target network element, from the control plane device; and
  deleting all packet data network connections corresponding to the first identifier of the target network element.

10. The method of claim 9, wherein sending identifier of the allocated forwarding plane tunnel resource comprises:
  sending a forwarding plane device circuit switched identifier corresponding to the forwarding plane tunnel resource to the control plane device.

11. The method of claim 10, wherein sending identifier of the allocated forwarding plane tunnel resource comprises:
  enabling the control plane device to send an external using circuit switched identifier corresponding to the forwarding plane tunnel resource to the target network element.

12. The method of claim 9, the method further comprising:
  acquiring a second identifier corresponding to the forwarding plane tunnel resource request message from the control plane device.

13. The method of claim 9, the method further comprising:
  acquiring an external using circuit switched identifier of the target network element from the control plane device.

14. A method for managing a forwarding plane tunnel resource in a communication system, in which a control plane and a forwarding plane are decoupled, comprising:
  when an internal condition is satisfied, sending, by a control plane device, a forwarding plane tunnel resource request message to a forwarding plane device, allocating, by the forwarding plane device, a forwarding plane tunnel resource based on the forwarding plane tunnel resource request message;
  sending, by the forwarding plane device, an identifier of the allocated forwarding plane tunnel resource to the control plane device, wherein the identifier of the allocated forwarding plane tunnel resource is used to establish a packet data network connection with a target network element;
  sending, by the control plane device, the identifier of the allocated forwarding plane tunnel resource to a target network element;
  when the control plane device detects a failure of a component in the control plane device, acquiring a first identifier corresponding to the failure;
  deleting all packet data network connections corresponding to the first identifier, wherein the first identifier corresponds to the component within the control plane device;
  acquiring a second identifier based on the first identifier; and
  sending the second identifier to a target network element associated with the second identifier, to enable the target network element associated with the second identifier to delete all packet data network connections corresponding to the second identifier.

15. The method of claim 14, wherein
  the identifier of the allocated forwarding plane tunnel resource is sent to the target network element.

16. A communication system, in which a control plane and a forwarding plane are decoupled, comprising a control plane device and a forwarding plane device, wherein the control plane device is configured to send a forwarding plane tunnel resource request message to a forwarding plane device in response of determining an internal condition is satisfied, the forwarding plane device is configured to allocate a forwarding plane tunnel resource based on the forwarding plane tunnel resource request message;

the forwarding plane device is also configured to send an identifier of the allocated forwarding plane tunnel resource to the control plane device, wherein the identifier of the allocated forwarding plane tunnel resource is used to establish a packet data network connection with a target network element;

the control plane device is also configured to send the identifier of the allocated forwarding plane tunnel resource to a target network element;

when the control plane device detects a failure in the control plane device, the control plane device is also configured to acquire a first identifier corresponding to the failure;

the control plane device is also configured to delete all packet data network connections corresponding to the first identifier;

the control plane device is also configured to acquire a second identifier based on the first identifier; and the control plane device is also configured to send the failure external using circuit switched second identifier to a target network element associated with the second identifier, to enable the target network element associated with the second identifier to delete all packet data network connections corresponding to the second identifier.

17. The communication system of claim 16, wherein the identifier of the allocated forwarding plane tunnel resource is sent to the target network element.

* * * * *